(12) United States Patent
Weder et al.

(10) Patent No.: US 11,643,550 B2
(45) Date of Patent: May 9, 2023

(54) SHAPE MEMORY POLYMERS

(71) Applicant: ADOLPHE MERKLE INSTITUTE, UNIVERSITY OF FRIBOURG, Fribourg (CH)

(72) Inventors: Christoph Weder, Düdingen (CH); Anuja Shirole, Fribourg (CH); Carlo Perotto, Oberrieden (CH); Julia Lonsky, Zürich (CH); Konstantin Silberzahn, Meilen (CH)

(73) Assignee: ADOLPHE MERKLE INSTITUTE, UNIVERSITY OF FRIBOURG, Fribourg (CH)

(*) Notice: Subject to any disclaimer, the term of this patent is extended or adjusted under 35 U.S.C. 154(b) by 349 days.

(21) Appl. No.: 16/978,035

(22) PCT Filed: Apr. 4, 2019

(86) PCT No.: PCT/EP2019/058567
§ 371 (c)(1),
(2) Date: Sep. 3, 2020

(87) PCT Pub. No.: WO2019/193124
PCT Pub. Date: Oct. 10, 2019

(65) Prior Publication Data
US 2020/0407554 A1 Dec. 31, 2020

Related U.S. Application Data

(60) Provisional application No. 62/653,163, filed on Apr. 5, 2018.

(51) Int. Cl.
| | |
|---|---|
| C08L 75/06 | (2006.01) |
| C08G 18/42 | (2006.01) |
| C08J 3/00 | (2006.01) |
| C08L 67/02 | (2006.01) |
| C08L 67/04 | (2006.01) |
| H04R 25/00 | (2006.01) |
| H04R 31/00 | (2006.01) |

(52) U.S. Cl.
CPC .......... *C08L 75/06* (2013.01); *C08G 18/4238* (2013.01); *C08G 18/4277* (2013.01); *C08J 3/005* (2013.01); *C08L 67/02* (2013.01); *C08L 67/04* (2013.01); *H04R 25/652* (2013.01); *H04R 31/00* (2013.01); *C08G 2280/00* (2013.01); *C08J 2367/02* (2013.01); *C08J 2367/04* (2013.01); *C08J 2375/06* (2013.01); *C08J 2467/02* (2013.01); *C08J 2467/04* (2013.01); *C08J 2475/06* (2013.01); *C08L 2207/04* (2013.01)

(58) Field of Classification Search
CPC .......... C08L 75/06; C08L 67/02; C08L 67/04; C08L 2207/04; C08G 18/4238; C08G 18/4277; C08G 2280/00
See application file for complete search history.

(56) References Cited

U.S. PATENT DOCUMENTS

| | | |
|---|---|---|
| 7,371,799 B2 | 5/2008 | Mather et al. |
| 2011/0274883 A1 | 11/2011 | Lowe et al. |
| 2015/0140300 A1 | 5/2015 | Pudleiner et al. |

FOREIGN PATENT DOCUMENTS

| | | |
|---|---|---|
| CN | 101260220 A | 9/2008 |
| CN | 107137789 A | 9/2017 |
| CN | 106566398 A | 4/2019 |
| EP | 2075279 A1 | 7/2009 |

OTHER PUBLICATIONS

Dogan et al.; Journal of the Mechanical Behavior of Biomedical Materials, 2017, vol. 71, p. 349-361.*
Yang, S., et al.; Journal of Applied Polymer Science, 2013, p. 4047-4053.*
Shrivastava, A.; Introduction to Plastics Engineering, 2018, p. 10-12.*
Raja et al., Thermal, mechanical and electroactive shape memory properties of polyurethane (PU)/poly (lactic acid) (PLA)/CNT nanocomposites, European Polymer Journal, 2013, pp. 3492-3500, Elsevier Ltd.

(Continued)

*Primary Examiner* — Robert S Jones, Jr.
(74) *Attorney, Agent, or Firm* — Hudak, Shunk & Farine Co. LPA

(57) ABSTRACT

Shape memory polymers allow the fabrication of objects that have a permanent (first) shape, and which can be programmed to adopt a temporary (second) shape, and are able to largely recover their original (first) shape by applying an appropriate stimulus. Materials that permit the fabrication of objects and devices that can (i) be provided in their permanent shape, (ii) be heated to a switching temperature above physiological temperature, at which the material becomes shapeable, (iii) be inserted into the body or placed in contact with the body and be deformed or shaped"to assume a desired temporary shape, (iv) be fixed in the desired temporary shape by keeping the material/device/object at body temperature (about 37° C.) for a convenient period of time, (v) largely retain this temporary shape if removed from the body, and (vi) return largely to their original shape when heated again above the switching temperature. A process for making such materials and disclosed products based on such materials are disclosed.

17 Claims, 11 Drawing Sheets

(56) References Cited

OTHER PUBLICATIONS

Li, Y. et al., Branched Polytetrahydrofuran and Poly (tetrahydrofuran-co-ϵ-caprolactone) Synthesized by Janus Polymerization: A Novel Self-Healing Material, Macromolecular Chem. Phys., 2017, vol. 218, 1600450 (1 of 7).
Salmoria, G. et al., Manufacturing of PCL/SAg Tubes By Melt-Extrusion For Nerve Regeneration: Structure and Mechanical Properties, Polymer Testing, 2016, vol. 55, pp. 160-163.
Kim, B. et al., Polyurethanes Having Shape Memory Effects, Polymer, 1996, vol. 37, No. 26, pp. 5781-5793.
Nicharat, A. et al., Thermally Activated Shape Memory Behavior of Melt-Mixed Polyurethane/Cellulose Nanocrystal Composites, J. Appl. Polym. Sci., 2017, vol. 134, 45033 (1 of 10).
Christenson, E. et al., Relationship between Nanoscale Deformation Processes and Elastic Behavior of Polyurethane Elastomers, Polymer, 2005, vol. 46, pp. 11744-11754.
Xie, T., Recent Advances in Polymer Shape Memory, Polymer, 2011, vol. 52, pp. 4985-5000.
Karger-Kocsis, J. et al., Biodegradable Polyester-Based Shape Memory Polymers: Concepts of (supra)molecular Architecturing, XPress Polymer Letters, 2014, vol. 8, No. 6, pp. 397-412.
Raja, M. et al., Thermal, Mechanical and Electroactive Shape Memory Properties of Polyurethane (PU)/Poly (lactic acid) (PLA)/CNT Nanocomposites, European Polymer Journal, 2013, vol. 49, pp. 3492-3500.
Liu, C. et al., P. Review of Progress in Shape-Memory Polymers. J. Mater. Chem. 2007, vol. 17, pp. 1543-1558.
Lendlein, A. et al., Shape-Memory Polymers, Angew. Chem. Int. Ed., 2002, vol. 41, pp. 2034-2057.
Lendlein, A. et al., Biodegradable, Elastic Shape-Memory Polymers for Potential Biomedical Applications, Science, 2002, vol. 296, pp. 1673-1676.
Hager, M. et al., Shape Memory Polymers: Past, Present and Future Developments, Prog. Polym. Sci., 2015, 49-50, pp. 3-33.
Mather, P. et al., Shape Memory Polymer Research, Ann. Rev. Mater. Res., 2009, vol. 39, pp. 445-471.
Hu, J. et al., Recent Advances in Shape-Memory Polymers: Structure, Mechanism, Functionality, Modeling and Applications, Prog. Polym. Sci., 2012, vol. 37, pp. 1720-1763.
Garle, A. et al., Thermoresponsive Semicrystalline Poly(ϵ-Caprolactone) Networks: Exploiting Cross-Linking with Cinnamoyl Moieties to Design Polymers with Tunable Shape Memory, ACS Appl. Mater. Interfaces, 2012, vol. 4, pp. 645-657.
Rivero, G. et al., One-Pot Thermo-Remendable Shape Memory Polyurethanes, Macromolecules, 2014, vol. 47, pp. 2010-2018.
Yu, K. et al., Temperature Memory Effect in Amorphous Shape Memory Polymers, Soft Matter, 2014, vol. 10, pp. 9423-9432.
Lendlein, A. et al., Light-Induced Shape-Memory Polymers, Nature, 2005, vol. 434, pp. 879-882.
Ikeda, T. et al., Photomechanics of Liquid-Crystalline Elastomers and Other Polymers, Angew. Chem. Int. Ed., 2007, vol. 46, pp. 506-528.
Han, X.J. et al., pH-Induced Shape-Memory Polymers, Macromol. Rapid Commun., 2012, vol. 33, pp. 1055-1060.
Ang, J. et al., Engineering Porous Water-Responsive Poly (PEG/PCL7PDMS Urethane) Shape Memory Polymers, Macromole. Mater. Eng., 2017, vol. 302, 1700174 (1 of 11).
Yakacki, C. et al., Unconstrained Recovery Characterization of Shape-Memory Polymer Networks for Cardiovascular Applications, Biomaterials, 2007, vol. 28, pp. 2255-2263.
Chan, B.Q.Y et al., Recent Advances in Shape Memory Soft Materials for Biomedical Applications, ACS Appl. Mater. Interfaces, 2016, vol. 8, pp. 10070-10087.
Jeong, H. et al., Synthesis and Properties of Thermotropic Liquid Crystalline Polyurethane Elastomers, Polymer, 2000, vol. 41, pp. 1849-1855.

Koerner, H. et al., Remotely Actuated Polymer Nanocomposites—Stress-Recovery of Carbon-Nanotube-Filled Thermoplastic Elastomers, Nat. Mater., 2004, vol. 3, pp. 115-120.
Gall, K. et al., Internal Stress Storage in Shape Memory Polymer Nanocomposites, Appl. Phys. Lett., 2004, vol. 85, pp. 290-292.
Khibakdar, H. et al., Investigation and Modeling of Temperature Dependence Recovery Behavior of Shape-Memory Crosslinked Polyethylene, Macromol. Theory Simul., 2007, vol. 16, pp. 43-52.
Lin, J. et al., Study on Shape-Memory Behavior of Polyether-Based Polyurethanes II. Influence of Soft-Segment Molecular Weight, J. Appl. Polym. Sci., 1998, vol. 69, pp. 1575-1586.
Xu J. et al., Synthesis and Shape Memory Effects of Si—O—Si Cross-Linked Hybrid Polyurethanes, Polymer, 2006, vol. 47, pp. 457-465.
Leng, J. et al., Shape-Memory Polymers and Their Composites: Stimulus Methods and Applications, Prog. Mater Sci., 2011, vol. 56, pp. 1077-1135.
Liu, Y. et al., Shape Memory Polymers and Their Composites in Aerospace Applications: A Review, Smart Mater. Struct., 2014, vol. 23, pp. 1-22.
Lan, X. et al., Fiber Reinforced Shape-Memory Polymer Composite and Its Application in a Deployable Hinge, Smart Mater. Struct., 2009, vol. 18, 024002, pp. 1-6.
Shirole, A. et al., Shape Memory Composites Based on Electrospun Poly(Vinyl Alcohol) Fibers and a Thermoplastic Polyether Block Amide Elastomer, ACS Appl. Mater. Interfaces, 2016, vol. 8, pp. 6701-6708.
Mohr, R. et al., Initiation of Shape-Memory Effect by Inductive Heating of Magnetic Nanoparticles in Thermoplastic Polymers, Proc. Natl. Acad. Sci. USA, 2006, vol. 103, pp. 3540-3545.
Zou, H. et al., Shape-Memory Polyurethane Nanocomposites with Single Layer or Bilayer Oleic Acid-Coated Fe3O4Nanoparticles, Macromol. Mater. Eng., 2015, vol. 300, pp. 885-892.
Liu, Y. et al., Water-Induced Shape-Memory Poly(D,L-Lactide)/Microcrystalline Cellulose Composites, Carbohydrate Polymers, 2014, vol. 104, pp. 101-108.
Mendez, J. et al., Bioinspired Mechanically Adaptive Polymer Nanocomposites with Water-Activated Shape-Memory Effect, Macromolecules, 2011, vol. 44, 6827-6835.
Meng, O. et al., A Review of Shape Memory Polymer Composites and Blends, Composites Part A: Appl. Sci. Manufac., 2009, vol. 40, pp. 1661-1672.
Behl, M. et al., Shape-Memory Capability of Binary Multiblock Copolymer Blends with Hard and Switching Domains Provided by Different Components, Soft Matter, 2009, vol. 5, oo, 676-684.
Li, S.C. et al., Thermostimulative Shape-Memory Effect of Reactive Compatibilized High-Density Polyethylene/Poly(Ethylene Terephthalate) Blends by an Ethylene-Butyl Acrylate-Glycidyl Methacrylate Terpolymer, J. Appl. Polym. Sci., 2009, vol. 112, pp. 3341-3346.
Weiss, R. et al., New Design of Shape Memory Polymers: Mixtures of an Elastomeric Ionomer and Low Molar Mass Fatty Acids and Their Salts, Macromolecules, 2008, vol. 41, pp. 2978-2980.
Zhang, H. et al., A novel type of shape memory polymer blend and the shape memory mechanism, Polymer, 2009, vol. 50, pp. 1596-1601.
Zhang, W. et al., Surprising Shape-Memory Effect of Polylactide Resulted from Toughening by Polyamide Elastomer, Polymer, 2009, vol. 50, pp. 1311-1315.
Jeong, H. et al., Miscibility and Shape Memory Effect of ThermoplasticPolyurethane Blends with Phenoxy Resin, Eur. Polymer Journal, 2001, vol. 37, pp. 2245-2252.
Jeong, H. et al., Miscibility and Shape Memory Property of Poly (Vinyl Chloride)/Thermoplastic Polyurethane Blends, J. Mater. Sci., 2001, vol. 36, pp. 5457-5463.
Zhang, L. et al., Bio-Based Shape Memory Polyurethanes (Bio-SMPUs) with Short Side Chains in the Soft Segment, Journal of Materials Chemistry A, 2014, vol. 2, pp. 11490-11498.
Singhal, P. et al., Low Density Biodegradable Shape Memory Polyurethane Foams for Embolic Biomedical Applications, Acta Biomater., 2014, vol. 10, pp. 67-76.
Bouaziz, R. et al., Thermo-Mechanical Modeling of Semi-Crystalline Thermoplastic Shape Memory Polymer under Large Strain, Smart Mater. Struct., 2017, vol. 26, 055009 (12 pp.).

(56) References Cited

OTHER PUBLICATIONS

Ecker, M. et al., Novel Design Approaches for Multifunctional Information Carriers, RSC Adv., 2014, vol. 4, pp. 46680-46688.

Bothe, M. et al., Poly (Ester Urethane) with Varying Polyester Chain Length: Polymorphism and Shape-Memory Behavior, Macromol. Chem. Phys., 2013, vol. 214, pp. 2683-2693.

Mirtschin, N. et al., Designing Temperature-Memory Effects in Semicrystalline Polyurethane, RSC Adv., 2015, vol. 5, p. 46307-46315.

Fritzsche, N. et al., Programming of Temperature-Memory Onsets in a Semicrystalline Polyurethane Elastomer, Macromolecules, 2014, vol. 47, pp. 5952-5959.

Shirole, A. et al., Tailoring The Properties of Shape Memory Poly(Ester Urethane) by Nanocomposite Formation and Nucleation, Macromolecules, 2018, vol. 51, pp. 1841-1849.

Liu, Li-Zhi et al., Synchrotron SAXS Study of Crystallization and Microphase Separation in Compatible Mixtures of Tetrahydrofuran-Methyl Methacrylate Diblock Copolymer and Poly(tetrahydrofuran), Macromolecules, 1996, vol. 29, pp. 5336-5345.

Woo, E. et al., Thermal and X-Ray Analysis of Polymorphic Crystals, Melting, and Crystalline Transformation in Poly(Butylene Adipate), J. Polym. Sci., Part B: Polym. Phys., 2005, vol. 43, pp. 1662-1672.

Wang, M. et al., Reinvestigation of the β-to-α Crystal Phase Transition of Poly(Butylene Adipate) by the Time-Resolved X-Ray Scattering and FTIR Spectral Measurements in the Temperature-Jump Process, Macromolecules, 2017, vol. 50, pp. 3883-3889.

Ajili, S. et al., Polyurethane/Polycaprolactane Blend With Shape Memory Effect as a Proposed Material for Cardiovascular Implants, Acta Biomaterialia, 2009, vol. 5, pp. 1519-1530.

Tanghe, E. et al., Segmented Polymer Networks Containing Amino-Dendrimers, Polymers Int'l, 2003, vol. 52, pp. 191-197.

F. Mostafavi et al., Physical Characterization and Rheological Behavior of Polyurethane/Poly(poly-caprolactone) Blends, Prepared by Solution Blending Using Dimethylacetamide, Journal of Applied Polymer Science, 2012, pp. 4091-4099, vol. 124, Wiley Periodicals, Inc.

\* cited by examiner

SHAPE MEMORY POLYMERS

FIELD OF THE INVENTION

Shape memory polymers allow the fabrication of objects that have a permanent (first) shape, and which can be programmed to adopt a temporary (second) shape, and are able to largely recover their original (first) shape by applying an appropriate stimulus. One application domain of shape memory polymers is in biomedical applications, such as self-expanding devices for minimally intrusive surgery or self-tying sutures. Most of the prior art shape memory materials for use in biomedical applications were designed to enable objects that can be applied in a temporary shape with the goal to restore the permanent shape inside or around the body, using either the increase in temperature (provided by the body or external heating) or the physiological fluid (or both) as stimulus or "trigger" for the release. The present invention relates to materials that allow an inversion of this scheme and permit the fabrication of objects and devices that can (i) be provided in their permanent shape, (ii) be heated to a switching temperature above physiological temperature, at which the material becomes shapeable, (iii) be inserted into the body or placed in contact with the body and be deformed or "shaped" to assume a desired temporary shape, (iv) be fixed in the desired temporary shape by keeping the material/device/object at body temperature (about 37° C.) for a convenient period of time, (v) largely retain this temporary shape if removed from the body, and (vi) return largely to their original shape when heated again above the switching temperature. In preferred embodiments of the present invention, the cycle of creating and releasing a temporary shape can be repeated many times and a different temporary shape can be programmed in each cycle. The shape-memory behavior displayed by the materials according to the invention ensures that (i) the permanent shape of the object or device is not irreversibly lost during the procedure, notably heating above the switching temperature and (ii) that the original shape can be recovered when needed, for example when the object or device shall be removed or re-shaped. The invention also relates to a process for making such materials and disclosed products based on such materials.

BACKGROUND OF THE INVENTION

Shape memory polymers (SMPs) constitute a class of mechanically adaptive materials, which allow the fabrication of objects that have a permanent (first) shape, and which can be programmed to adopt a temporary (second) shape when simultaneously subjected to a mechanical force and another appropriate stimulus, such as for example heat, light, an electromagnetic field, or a pH change.[1-7] This process is generally referred to as "fixing" a temporary shape. The original shape can later, when desired, be recovered upon exposure of the object to the same or another suitable stimulus. SMPs require a structure that provides rubber elasticity and a switching phase that is responsive to an external stimulus and which serves as a second type of cross-link that can be switched on or off. Although heat[1, 8-10] remains the most common stimulus to trigger shape memory effects in polymers, the introduction of light-active,[11-12] pH-active,[13] or water active[14] moieties into elastic polymer networks has permitted the use of other stimuli. A plethora of SMPs has been developed for potential use in advanced technological and biomedical applications.[4-6, 15-16] Continuous efforts have been dedicated to the overall improvement of the SMPs, certain limitations such as low stiffness,[17-19] low recovery stress,[20] long response time,[21] limited durability of the SM behavior,[22-23] or complicated synthesis restrict their potential technological use. Other problems include low fixity, poor recovery, or unsuitable requirements for the fixing and release conditions. Of course, the specific property matrix to be attained, depends on the targeted application. While the properties of SMPs can a priori be tailored through the variation of their composition, the mechanical properties of a given material can be further modified by fabricating (nano)composites[24-25] by adding micro or nano sized fillers such as fibers, [26-27] particles, [26-29] or nanocrystals.[30-31] A related design approach to either create new shape memory materials or modifying the properties of existing SMPs is the fabrication of blends. Materials in which the shape memory effect is an emergent property can be accessed by combining an elastic polymer with a second polymer that forms the fixing phase,[32,33] for example a semicrystalline or an amorphous polymer whose mechanical properties can be switched by heating above the melting ($T_m$) or glass transition ($T_g$) temperature.[36-38] Shape memory behavior can also be achieved in binary blends of two crystalline polymers, in which one crystal type forms the fixing phase and the other a reversible cross-linking phase.[34-36] It is also possible to tailor the properties of existing SMPs by blending them with another polymer, which may have the same or a different chemical structure as the segments of which the SMP is comprised.[33] For instance, shape memory polymer blends of a PU with phenoxy or poly(vinyl chloride) were reported, which exhibited tunable switching transition temperature and improved the mechanical properties, respectively.[39-40]

For applications in the biomedical field, it is particularly important that the fixation and recovery temperatures can be minutely tailored around the human body temperature.[41-42] It can further be advantageous if the mechanical characteristics of a given materials platform can be modified without changing the SMP's chemical constituents. Most of the prior art materials were tailored to allow objects, products and devices to be applied in a temporary shape with the goal to restore the permanent shape inside or around the body, using either the increase in temperature (provided by the body or external heating) or the physiological fluid (or both) as trigger. Examples include self-tying sutures and self-expanding devices for minimally intrusive surgery, such as the Igaki-Tamai endovascular stent. This self-expanding stent is made of poly(L-lactide), which has a transition temperature around 70° C., meaning that the expansion of the implant in the veins must be triggered by heating to this relatively high temperature.

SUMMARY OF THE INVENTION

In this specification, all numbers disclosed herein designate a set value, individually, in one embodiment, regardless of whether the word "about" or "approximate" or the like is used in connection therewith. In addition, when the term such as "about" or "approximate" is used in conjunction with a value, the numerical range may also vary, for example by 1%, 2%, or 5%, or more in various other, independent, embodiments. All ranges set forth in the specification and claims not only include the end points of the ranges but also every conceivable number between the end points of the ranges.

The terms "polymer" and "(co)polymer", as used herein, refer to a polymeric compound prepared by polymerizing monomers whether of the same or a different type. As used herein, said terms embrace the terms "homopolymer", "copolymer", "terpolymer" and "interpolymer". The term "interpolymer" as used herein refers to polymers prepared by the polymerization of at least two different types of monomers.

The present invention relates to materials that allow an inversion of this scheme and permit the fabrication of objects and devices that can (i) be provided in their permanent shape, (ii) be heated above a switching temperature above physiological temperature, at which the material becomes deformable or shapeable, (iii) be inserted into the body or placed in contact with the body and be deformed to assume a desired temporary shape, (iv) be fixed in the desired temporary shape by keeping the object/device around body temperature (37° C.) for a convenient period of time, (v) and largely retain this temporary shape if removed from the body. In preferred embodiments, the objects or devices based on materials according to the present invention (vi) return largely to their original shape when heated again above the switching temperature, and (vii) the shape fixing and releasing cycle can be repeated many times. The shape-memory effect displayed by the polymer ensures that (i) the permanent shape of the device is not irreversibly lost during the procedure, notably heating above the switching temperature and (ii) that the original shape can be recovered when needed, for example when the object or device shall be removed or re-shaped. Applications in which such a material as disclosed herein is desirable include, but are not limited to, hearing aids, such as over-the-counter (OTC) hearing aids, hearables, earbuds, ear-level devices for health monitoring applications, in-ear implants, earpieces of hearing aids, telephones, stethoscope, or other instruments, earphones, in-ear headphones, earplugs, catheter retainers, mouth guards, orthodontic devices, frame temples, surgical staples, materials for surgical reconstruction, pressure garments, toys, automotive parts, ocular prosthesis, manufacturing of shape-memory fibers, shape memory textiles and clothing, gloves, shoe soles and insoles, shape memory foams, adapting grips, sportswear (such as helmets, shin guards), and select portions or components of each. Such and all other objects and devices based on the materials disclosed here are also part of the present invention, as are methods to make and use such materials.

One possible solution to achieve the shape-memory behaviour outlined above is to use a shape memory material with a switching temperature that is above body temperature, but low enough to inflict no or minimal harm when the device is brought in contact with the body at a temperature above this switching temperature, that is, at a temperature at which the material is still shapeable. This solution works for objects and devices with a comparably large mass and/or for which cooling is slow, so that after heating and bringing the device in contact with the body the object's temperature remains above the switching temperature and cools only after shaping.

This method is suitable for devices where shape adaptation is simple and fast, and risks associated with "misshaping" (i.e., when the device is cooled too fast) or harm to the body are low. Another possibility is to use a shape memory material with a switching temperature above body temperature and "slow" fixation. In other words, when the material and objects or devices fabricated from the material are cooled from above the switching temperature to body temperature, the material remains shapeable for a certain period of time (shaping time) that is sufficiently long to allow the material and objects or devices made from or containing the material to be positioned and shaped as required, before fixation occurs. Materials, objects, and devices with these capabilities constitute the subject of the present invention. This solution is particularly useful for small objects or devices (or parts thereof) that cool faster than the time required for positioning and bringing them into the temporary shape. The shape memory materials according to the present invention have the following attributes:

i. They can be melt-processed into a desired (permanent) shape;
ii. They have a switching temperature above body temperature (37° C.), above which the material becomes elastic and shapeable;
iii. They remain shapeable after being heated above said switching temperature and cooled to a fixation temperature below said switching temperature for a period of time that is referred to as fixing time and can be deformed into a temporary shape that is then fixed;
iv. The temporary shape should be fixable around body temperature and preferably at 37+/−10° C., more preferably at 37+/−5° C. and most preferably at 37+/−2° C. within a convenient period of time; this fixing time should be about 60 min or less, preferably less than about 30 min, more preferably less than about 20 min, most preferably 10 min or less, and ideally about 5 min. In preferred embodiments of the invention, the switching time is not faster than 10 sec, preferably not faster than 30 sec, and most preferably not faster than 1 min;
v. The switching temperature should be about 42° C. or more, preferably 45° C. or more, more preferably 50° C. or more, and most preferably 52° C. above; in preferred embodiments, the switching temperature is less than 100° C., preferably less than 90° C., more preferably less than 75° C., and most preferably less than about 65° C.
vi. In preferred embodiments of the present invention, the temporary shape can be released by heating above the switching temperature so that the permanent shape is largely or partially recovered. In most preferred embodiments a new temporary shape can subsequently be programmed; in other words, the fix/release cycle can be repeated several times.

A widely investigated, commercially available shape memory poly(ester urethane)[43-46] consisting of crystallizable poly(1,4-butylene adipate) (PBA) soft/switching segments and hard segments composed of 4,4-methylenediphenyl diisocyanate and 1,4-butanediol (PBA-PU)[47-49] shall serve to illustrate the state of the art and its limitations with respect to the present invention.

The first heating cycle of a differential scanning calorimetry measurement of a melt-processed film of the neat PBA-PU, recorded at a rate of 10° C.·min$^{-1}$ (FIG. 2a) shows a broad exothermic melting transition with a maximum at a temperature ($T_m$) of 47° C. and a shoulder around 52° C., indicative of the presence of melting of PBA segments in a mixture of α and β polymorphs, recrystallization of the β into the α form around 50° C. and melting of the α form above 50° C.[52-53] The first DSC cooling trace (FIG. 2b), recorded with a rate of 10° C.·min$^{-1}$, reveals a crystallization peak with a maximum temperature $T_c$ of 7° C. The crystallization temperature $T_c$ shifted to higher temperatures when the cooling rate was decreased to 5° C.·min$^{-1}$ (12° C.) and 2° C.·min$^{-1}$ (16° C.), but neither a reduction in cooling nor heating rate changed the melting temperature much significantly. Shape memory experiments (see below) show that the temperature at which the PBA segments melt ($T_m$) serves as switching temperature, and the temperature at which good fixity (>97%) could be rapidly achieved is 10° C. We recently showed[50] that this temperature could be increased to 25° C. by melt-mixing the PBA-PU with 1% w/w dodecanoic acid. The data show that $T_c$ increased to 15° C. (measured at a cooling rate of 10° C.·min$^{-1}$), which explains why the switching element can be fixed at a higher temperature than in the neat PBA-PU. Unfortunately, the $T_m$ was slightly reduced in comparison to the neat PBA-PU to 44-47° C. Size exclusion chromatography traces revealed a dramatic reduction of the number- and weight-average molecular weights from 110,000 to 20,000 and 229,000 to 66,000 Da, respectively, which suggests that the nucleation process is driven by chain scission and nucleation of the chain ends, as reported previously by others. Furthermore, we screened other potential nucleating agents for PBA-PU, including fatty acids (sodium dodecanoate, sodium palmitate, hexacosanoic acid, sodium octacosanoate) and their salts, benzoic acid derivatives (4-methoxybenzoic acid, 4-decyloxybenzoic acid), sodium dodecylsulfate and inorganic nucleating agents such as talc, aluminum oxide and potassium carbonate. While the incorporation of 1% w/w of the benzoic acid derivatives, talc and alumina caused no changes of the thermal properties of the PBA-PU, some increase of $T_c$ was observed for all the fatty acids and their salts, sodium dodecyl sulfate, and potassium carbonate with the highest value being recorded for sodium dodecanoate ($T_c$ =23° C.). However, the reduction in number- and weight-averaged molecular weight caused by the addition of the nucleating agents was even more dramatic than for dodecanoic acid, reaching values as low as 9,000 (Me) and 24,000 Da ($M_w$) for sodium dodecanoate. The reduction of the molecular weight was accompanied by a drastic deterioration of the mechanical properties, resulting in the loss of elastomeric properties for the nucleated PBA-PU with the highest T. In summary, all these nucleating agents led to a large molecular weight decrease (concomitant with a degradation of the mechanical properties), many reduced the $T_m$, many had no influence on $T_c$ and none was capable of increasing the temperature at which good fixity (>97%) could be rapidly achieved to above 25° C.

We now surprisingly found that the fixing temperature can be substantially increased without compromising the mechanical properties or reducing the $T_m$ by melt-mixing PBA-PU with free PBA under conditions disclosed here. Indeed, it was possible to achieve excellent shape fixity (~96-98%) at physiological temperature (37° C.) within 15-20 min. Further, on account of a slight increase of $T_m$, the temperature at which the temporary shape is released was increased vis-à-vis the prior art PBA-PU. An in-depth investigation of the morphology and the thermal and mechanical behavior of these materials reveal the mechanisms at play, which allowed generalization of the invention and adapting the invention to other materials systems.

Thus, in one aspect, the invention relates to a thermoplastic shape memory composition, comprising a thermoplastic polymer and a modifier polymer; wherein a melting and crystallization of a crystallizable portion of the shape memory composition fixes a temporary shape; wherein a further melting of the crystallized portion of the shape memory composition releases the temporary shape; and wherein a crystallization temperature of said crystallizable portion of said shape memory composition is at least 1° C. higher than that of a crystallizable portion of the thermoplastic polymer without the modifier polymer.

In a further aspect of the above described shape memory composition the crystallization temperature of said crystallizable portion of said shape memory composition is higher by at least 5° C., at least 10° C., at least 15° C., or at least 20° C. than that of the crystallizable portion of the thermoplastic polymer without the modifier polymer.

In an additional aspect, combinable with any combination of the above aspects, the crystallization temperature and a melting temperature of said crystallizable portion of said shape memory composition differ by at least 10° C., at least 15° C., or at least about 30° C.

In another aspect, combinable with any combination of the above aspects, the crystallization temperature of the crystallizable portion of said shape memory composition is above about 10° C., above 15° C., above 20° C., above 23° C., or above 25° C.; wherein the crystallization temperature of the crystallizable portion of said shape memory composition is below 37° C., below 35° C., below 32° C., or below 30° C.; wherein said melting temperature of the crystallizable portion of said shape memory composition is above 42° C. or more, 45° C. or more, 50° C. or more, or 52° C. or above; and wherein in preferred embodiments, the melting temperature of the crystallizable portion of said shape memory composition is less than 100° C., preferably less than 90° C., more preferably less than 75° C., and most preferably less than about 65° C.

In a further aspect, combinable with any combination of the above aspects, said modifier polymer comprises a polyester, a poly(1,4-butylene adipate) or poly(caprolactone); and wherein the amount of modifier polymer is at least 5% by weight, at least 10% by weight, or at least 20% by weight based on 100 weight percent of the thermoplastic polymer and the modifier polymer.

In still an additional aspect, combinable with any combination of the above aspects, said modifier polymer is poly(1,4-butylene adipate) of a weight-average molecular weight of at least 6000 g·mol$^{-1}$ ior at least 9000 g·mol$^{-1}$ or poly(caprolactone) of a weight-average molecular weight of at least 10000 g·mol$^{-1}$.

In an additional aspect, combinable with any combination of the above aspects, said thermoplastic polymer comprises the reaction product of at least a (A) crystallizable prepolymer, (B) a low-molecular weight chain extender, and a (C) a diisocyanate.

In another aspect, combinable with any combination of the above aspects, said crystallizable prepolymer (A) a polyester or polyamide or polyether and said low-molecular weight chain extender (B) is a diol or diamine, and said diisocyanate (C) is an aromatic diisocyanate, such as toluene diisocyanate and methylene diphenyl diisocyanate or an aliphatic diisocyanate, such as hexamethylene diisocyanate, hydrogenated methylene diphenyl diisocyanate, and isophorone diisocyanate, or a combination thereof.

In a further aspect, combinable with any combination of the above aspects, said thermoplastic polymer and said modifier polymer have at least partially reacted with each other.

In an additional aspect, combinable with any combination of the above aspects, said thermoplastic polymer and said modifier polymer have essentially not reacted with each other.

Thus, in one aspect, the invention relates to a thermoplastic shape memory composition, comprising: a polymer, wherein melting and crystallization of a crystallizable portion of the shape memory composition fixes a temporary shape; wherein a further melting of the crystallized portion of the shape memory composition releases the temporary shape; and wherein the crystallization temperature of said crystallizable portion of said shape memory composition is above about 10° C., above 15° C., above 20° C., above 23° C., or above 25° C.; wherein the crystallization temperature of said crystallizable portion of said shape memory composition is below 37° C., below 35° C., below 32° C., or below 30° C.; wherein the melting temperature of said crystallizable portion of said shape memory composition is about 42° C. or more, 45° C. or more, 50° C. or more, or 52° C. or above; wherein the melting temperature of said crystalline portion of said shape memory composition is less than 100° C., preferably less than 90° C., more preferably less than 75° C., and most preferably less than about 65° C.

In a further aspect of the above described shape memory composition said shape memory polymer composition comprises a polyester, preferably poly(1,4-butylene adipate) or poly(caprolactone).

In one aspect, the invention relates to thermoplastic shape memory composition, comprising: wherein melting and recrystallization of a crystallizable portion of the shape memory composition fixes a temporary shape; wherein a further melting of the recrystallized portion of the shape memory composition releases the temporary shape; wherein a crystallization temperature of said crystallizable portion is above about 10° C., preferably above 15° C., above 20° C., or above 25° C.; and wherein said shape memory polymer comprises poly(1,4-butylene adipate).

In an additional aspect, combinable with any combination of the above aspects, a fixity of at least 90%, more than 94%, more than 96%, or more than 98% is achieved when the temporary shape is fixed at 37° C.

In a further aspect, combinable with any combination of the above aspects, said fixity can be achieved by fixing in 30 min or less, 20 min or less, or 15 min or less.

In one aspect, the invention relates to a method for producing a thermoplastic shape memory composition, comprising the steps of: combining at least a thermoplastic polymer and a modifier polymer and forming a product therefrom, having the characteristics as set forth in any combination of aspects above.

In one further aspect, the invention relates to shape memory object comprising any of the shape memory compositions or polymers according to any of the aspects set forth above.

Thus, in one aspect the invention relates to a shape memory object, wherein the object returns largely to an original shape when heated above the switching temperature, and wherein a shape fixing and releasing cycle can be repeated multiple times.

In a further aspect, the invention relates to the shape memory object according to any of the above aspects, wherein said shape memory object is selected from the list of: hearing aids, such as over-the-counter (OTC) hearing aids, hearables, earbuds, ear-level devices for health monitoring applications, in-ear implants, earpieces of hearing aids, telephones, stethoscope, or other instruments, earphones, in-ear headphones, earplugs, catheter retainers, mouth guards, orthodontic devices, frame temples, surgical staples, objects for surgery and surgical reconstruction, pressure garments, toys, automotive parts, ocular prosthesis, manufacturing of shape-memory fibers, shape memory textiles and clothing, gloves, shoe soles and insoles, shape memory foams, adapting grips, sportswear such as helmets and shin guards, or select portions or components of each.

Thus, in one aspect, the invention relates to a component of a hearing aid device for coupling to an ear of a hearing device user, comprising any of the shape memory compositions or polymers according to any of the above aspects as set forth above.

In a further aspect, the invention relates to a method to program the temporary shape of a shape memory composition or polymer according to any of the above aspects, comprising the steps of: heating the shape memory composition above a melting temperature of the crystallizable portion of the shape memory composition; conforming the thermoplastic shape memory composition to the temporary shape; and cooling the shape memory composition (near above or) below the crystallization temperature of the crystallizable portion of the shape memory composition or polymer while conforming the thermoplastic shape memory composition or polymer to the temporary shape.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
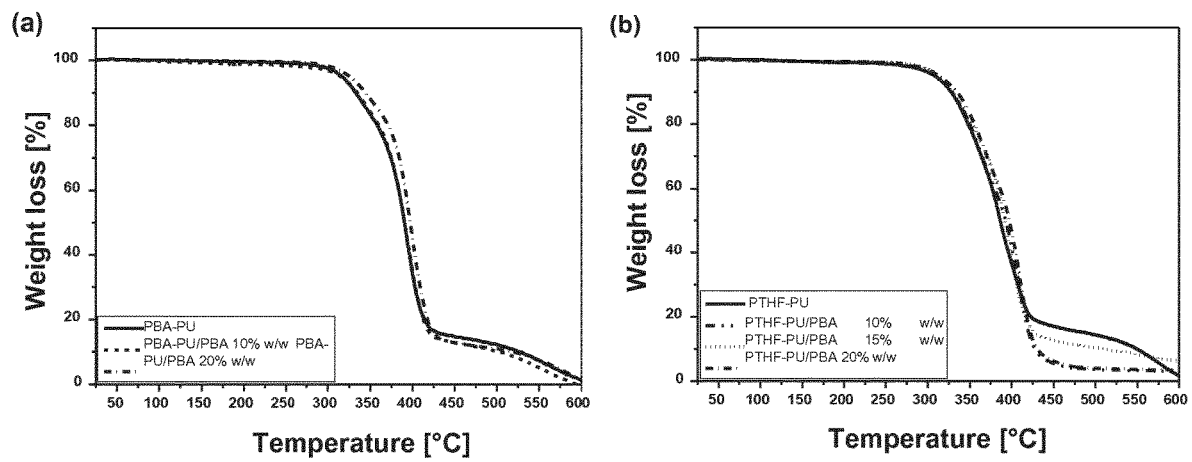
FIG. 1 illustrates TGA traces of (a) the neat PBA-PU and its blends with 10 and 20% w/w PBA and (b) the neat PTHF-PU and its blends with 10 and 20% w/w PBA.

Materials. The PBA-PU and PTHF-PU based on hard segments composed of 4,4-methylenebis (phenyl isocyanate) (MDI) and 1,4-butanediol (BD) as chain extender and soft/switching segments of poly(1,4-butylene adipate) (PBA) and poly(tetrahydrofuran) (PTHF) were kindly provided by Covestro Deutschland AG and Bayer MaterialScience (now Covestro) as Desmopan DP 2795 A and Texin 285 respectively. Poly(1,4-butylene adipate) (PBA) ($M_w$=12,000 g·mol$^{-1}$) was purchased from Sigma Aldrich or from Best of Chemicals from BOC Sciences, Shirley, USA and poly(caprolactone) (PCL, $M_w$=14,000·mol$^{-1}$, $M_n$=12,000·mol$^{-1}$) was purchased from Sigma Aldrich. Acetylated PBA (AcPBA) was prepared by reacting PBA with acetyl chloride in tetrahydrofuran/pyridine.

Fabrication of Blends of PBA-PU or PTHF-PU with PBA or AcPBA. The PBA-PU and PTHF-PU were dried at 70° C. for 3 h in the oven, prior to the fabrication of the blends. PBA-PU was melt-mixed with 10 or 20 or 30% w/w of PBA or 20% w/w AcPBA and PTHF-PU was melt-mixed with 10, 15, 20, or 30% w/w PBA by combining the respective PU and polyester in a roller blade mixer (RBM, Brabender® GmbH & Co. KG; mixer type 30EHT). The temperature and speed of the mixer were set to 180° C. and 70 rpm, respectively. Firstly, the PU (PBA-PU or PTHF-PU) was introduced to the RBM and processed until it formed a homogeneous melt (6 min). The PBA was then added to the PU melt and mixing was continued for another 4 min. The total load of the RBM was kept fixed at 20 g. For example, the composition of PBA-PU/PBA containing 10% w/w PBA was prepared using 18 g of PBA-PU and 2 g of PBA. The compositions were then removed from the mixer and cooled to room temperature. A 20% w/w PBA-PU/AcPBA blend and a 30% w/w PBA-PU/PCL blend were produced using the same protocol, but in the case of the PBA-PU/AcPBA blend, the processing temperature was increased to 190° C. The different compositions thus made were directly compression-molded to produce films having a thickness of 200-300 µm using spacers (for uniform thickness) between poly(tetrafluoroethylene) (PTFE) sheets in a Carver® press at 180° C. under a pressure of 4 metric tons for 5 min. The films thus obtained were removed from the hot press and cooled between the PTFE sheets to room temperature. Reference films of the neat PBA-PU and PTHF-PU were also prepared in an analogous manner using an identical protocol of processing the materials in an RBM and subsequent compression molding. All samples were stored under ambient conditions for typically at least 48 h before analysis. Solution-cast films of the 20% w/w PBA-PU/PBA blend were prepared by dissolving the PBA-PU (0.80 g) and PBA (0.20 g) in warm THF (40 mL) casting into a poly(tetrafluoroethylene) Petri dish and allowing the solvent to evaporate at room temperature over a period of three days. A portion of the solution-cast material was re-shaped by compression-molding as described above. Irrespective of the actual structure, the compositions disclosed here are, for convenience, referred to as "compositions", "blends", and "mixtures", and these terms should not be construed to imply any particular molecular structure.

Dynamic Mechanical Analysis (DMA). The dynamic mechanical properties of films of the neat PBA-PU and PTHF-PU as well as their blends with PBA were characterized using a TA Instrument DMA Q800. The experiments were conducted in tensile mode with a strain amplitude of 15 µm and at a frequency of 1 Hz. Experiments were carried out in the temperature range of −50 to 200° C., with a heating rate of 5° C.·min$^{-1}$. The samples were analyzed in the shape of strips having a width of 5-6 mm and a length of 8 mm. The mechanical data shown in Table 2 and values quoted for E in the text represent averages of 3-5 independent measurements±standard deviation. The stress-strain measurements of the prepared materials were performed using the same DMA instrument with a strain rate of 5%. min$^{-1}$, at 25° C. For these measurements, the films were cut into dog-bone shaped samples. The experiments were performed on 3-5 individual samples and the data is summarized in Table 3.

Thermogravimetric Analysis (TGA). The thermal stability of the neat PBA-PU and PTHF-PU as well as their blends with PBA was probed by thermogravimetric analysis using a Mettler-Toledo STAR thermogravimetric analyzer under $N_2$ atmosphere in the range of 25 to 600° C. with a heating rate of 10° C.·min$^{-1}$ using -5 mg of the sample.

Differential Scanning calorimetry (DSC). DSC measurements were performed on the neat PBA-PU and PTHF-PU as well as their blends with PBA using a Mettler-Toledo STAR system under $N_2$ atmosphere. The experiments were performed on ~8 mg samples placed in standard DSC pans. Samples were analyzed in the temperature range from 0 to 100° C. with heating and cooling rates of 10° C.·min$^{-1}$. The maximum of the melting endotherm was established as melting temperature ($T_m$) while the maximum temperature point of cooling exotherm was established as crystallization temperature ($T_c$).

Size Exclusion Chromatography. Size exclusion chromatography (SEC) measurements were carried out on an Agilent Technologies 1260 Infinity system equipped with a refractive index (RI) detector. The column system was composed of one guard column and two mixed bed PSS GRAM analytical linear 10 µm (300 mm×8.0 mm), with a separation range from 100 to 106 Da, at 55° C. DMF (LiBr 0.05M) was employed as solvent/eluent and the measurements were carried out at a flow rate of 0.5 mL/min. Data analyses were carried out on the PSS WinGPC Unchrom software and the mass-average molecular weight ($M_w$) and $M_n$ values were determined by comparison with poly(styrene) standards.

Optical Microscopy. All optical microscopy images were taken on an Olympus BX51 microscope equipped with a DP72 digital camera and a Linkam LTS350 heating/cooling stage, with a magnification of ten times. Two films of the neat PBA-PB and of the 20% w/w PBA-PU/PBA mixture (thickness ca. 200 µm) were placed on a glass slide. The temperature was increased to 70° C. (hating rate 10° C./min) and the melting of the crystalline domains was observed between crossed polarizers. The samples were kept at 70° C. for 10 min and subsequently cooled to 37° C. (cooling rate 40° C./min). The two samples were monitored during a 50 min isothermal annealing at 37° C. and the formation of crystallites observed under cross-polarized light. Finally, the thermal stability of the crystallites formed at 37° C. was evaluated by heating the samples to 40, 42.5, 45, 47.5, 50, 52 and 54° C. and keeping the system at each temperature for 10 min (40-47.5 and 54° C.), 50 min (50° C.) and 30 min (52° C.).

Wide Angle X-Ray Scattering. Films of the neat PBA, (compression molded at 80° C., under 3 metric tons pressure for 5 min), PBA-PU, PTHF-PU and their blends with PBA were analyzed by wide angle X-ray scattering (WAXS). WAXS spectra were recorded with a NanoMax-IQ camera (Rigaku Innovative Technologies) equipped with a Cu target sealed tube source (MicroMax-003, Rigaku) and a Pilatus100 K detector (Dectris). The samples were kept in vacuum at room temperature during the measurements. Raw data were processed according to standard procedures, and the scattering intensity is presented as a function of the momentum transfer $q=4\pi\lambda^{-1}\sin(\theta/2)$. $\theta$ is the scattering angle and $\lambda$=0.1524 nm is the photon wavelength. Each spectrum was fitted on the range of 14.5-16 nm$^{-1}$, against a linear combination of a quadratic function (interpreting the amorphous halo) and Gaussian functions (interpreting the Bragg-reflections from the crystal planes).

Shape Memory Analysis. The shape memory behavior of films of the neat PBA-PU, PTHF-PU and their blends with PBA was analyzed using the same equipment and sample geometry as used for the DMA experiments (see above). Cyclic stress-temperature-strain tests of the samples were conducted in controlled-force mode. The cyclic tests of all the samples started with heating the sample to 70° C. and maintaining it at this temperature for 5 min. An increasing force of up to 18 N (rate of 0.8 N·min$^{-1}$) was applied to deform the samples uniaxially with a strain limit of 40% (for neat PBA-PU and its blends with PBA, and the neat PTHF-PU) or 20% (for PTHF-PU blends with 10 or 20% w/w PBA). A strain abort step was introduced before applying the force to achieve the targeted strain limit. The samples were maintained stretched at 70° C. for 5 min, before cooling to 0 (PBA-PU, PTHF-PU), 10 (PBA-PU, 10% w/w PTHF-PU/PBA), 20° C. (blends of PBA-PU and PTHF-PU with 10% w/w PBA), 25° C. (10 or 20% w/w PBA-PU/PBA), 30 or 37° C. (20% and 30% w/w PBA-PU/PBA) at a rate of 5° C.·min$^{-1}$ and maintained at the respective fixing temperature for 5 min (all samples), 15 min (samples fixed at 25, 30 or 37° C. only), 20 min (30% w/w PBA-PU/PBA fixed at 37° C.) or 30 min (20% w/w PBA-PU/PBA, 20% w/w PBA-PU/AcPBA and 30% w/w PBA-PU/PCL fixed at 37° C.). After recording the changes in strain, the applied force was unloaded and the sample was maintained in this state for 5 min to fix the temporary shape. The sample was finally heated to 70° C. at a rate of 5° C.·min$^{-1}$, and kept at this temperature for 10 min to recover the original shape. Three cycles were conducted for each sample and the fixity (%) and recovery (%) for each cycle was calculated according to Eqs. (1) and (2):

$$\% \text{ Fixity} = \frac{\varepsilon_u - \varepsilon_i}{\varepsilon_s - \varepsilon_i} \times 100 \quad (1)$$

$$\% \text{ Recovery} = \frac{\varepsilon_u - \varepsilon_r}{\varepsilon_u - \varepsilon_i} \times 100 \quad (2)$$

where, $\varepsilon_s$ is the strain after stretching, $\varepsilon_u$ is the strain after unloading, $\varepsilon_r$ is the recovered strain after heating, and $\varepsilon_i$ is the initial strain.

An alternative shape memory cycle was also used to investigate the behavior when deforming the materials only after first cooling them to the fixing temperature. As for the shape memory test described above, the cyclic tests start with the sample being heated to 70° C. and being kept at this temperature for 5 min. The samples were then cooled to 37° C. (rate 5° C./min) to simulate the deployment of an object or a device, and kept at this temperature for 2 min. The samples were then uniaxially deformed, as described above, and kept under load isothermally for 15 min. After the removal of the stress, the cycle proceeded as for the conventional cycle.

The polyurethanes used as basis for the development of new SMP polymers and which also serve as reference materials that define the state of the art, PBA-PU and PTHF-PU, are commercially available and feature similar hard phases that are formed by the reaction of 1,4-butanediol and 4,4'-methylenebis(phenyl isocyanate). These TPUs contain, however, different soft phases. PBA-PU is based on poly(1,4-butylene adipate) as a soft segment, which partially crystallizes upon cooling to sub-ambient temperature and can serve as the switching element for a shape memory effect. The poly(tetrahydrofuran) segments present in PTHF-PU crystallize only poorly,[51] and as a result PTHF displays the thermomechanical properties of a typical polyurethane elastomer with poor shape memory characteristics.

These PUs were blended with 10-30% w/w of PBA by melt-mixing the components at 180° C. The PBA was thought to act as a modifier polymer that, by way of modifying the melting and crystallization behavior of the materials, could be used to modify their shape memory characteristics. The resulting blends were compression-molded at the same temperature into 200-300 μm thin films, then cooled to room temperature and stored under ambient conditions for at least 48 h before any characterization was conducted. All films are semitransparent, have a homogeneous appearance, and feature a similar haziness, indicating the absence of any significant macroscopic phase separation.

The thermal behavior of the various compositions was investigated by thermogravimetric analyses (TGA) and differential scanning calorimetry (DSC) experiments. TGA measurements under nitrogen reveal that both polyurethanes and their blends with PBA display only a moderate weight loss (around 5%) upon heating to above 300° C. (FIG. 1). The thermal transitions of all materials were analyzed by DSC experiments. Previous studies have established that the neat PBA[52] and also the PBA segments included in the PBA-PU[47] display a rather complicated crystallization behavior. Crystallization at different temperatures leads to different ratios of two polymorphs, the thermodynamically more stable α form and the kinetically preferred β form, which show slightly different melting temperatures. Recrystallization from the β to the α form is possible and on account of crystal size variations the α form can display two distinct melting transitions. Thus, a broad melting range with more or less well resolved peaks is usually observed. FIG. 2a and b show the first heating and the first cooling traces of the neat PBA-PU and its blends with PBA; the transition temperatures extracted from these measurements are compiled in Table 1.

Figure 2:
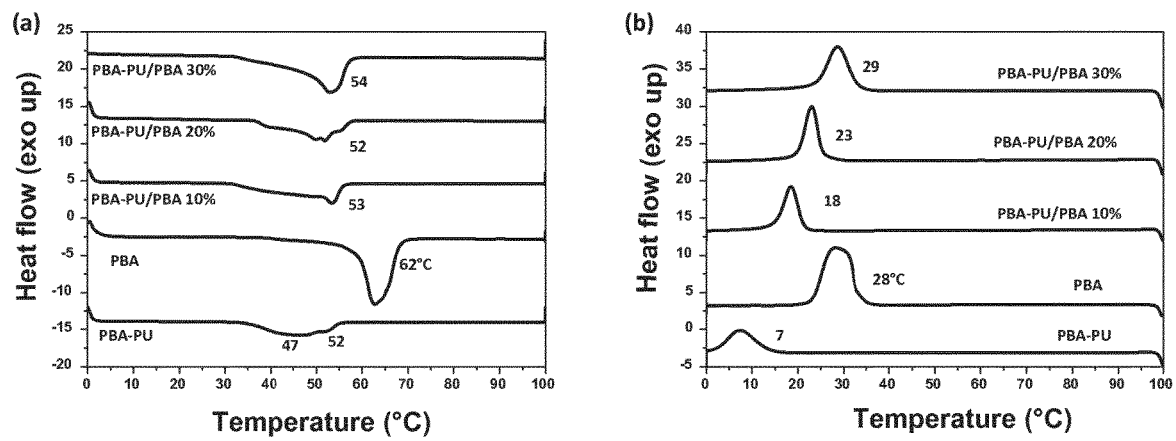
FIG. 2 illustrates DSC traces showing the first heating (a) and the first cooling cycles (b) of the neat PBA, PBA-PU and its blends with 10, 20 or 30% w/w PBA (a,b). The numbers indicate the maxima ($T_m$, $T_c$) and prominent shoulders of the melting/crystallization peaks. The experiments were conducted at heating/cooling rates of 10° C./min.
Figure 3:
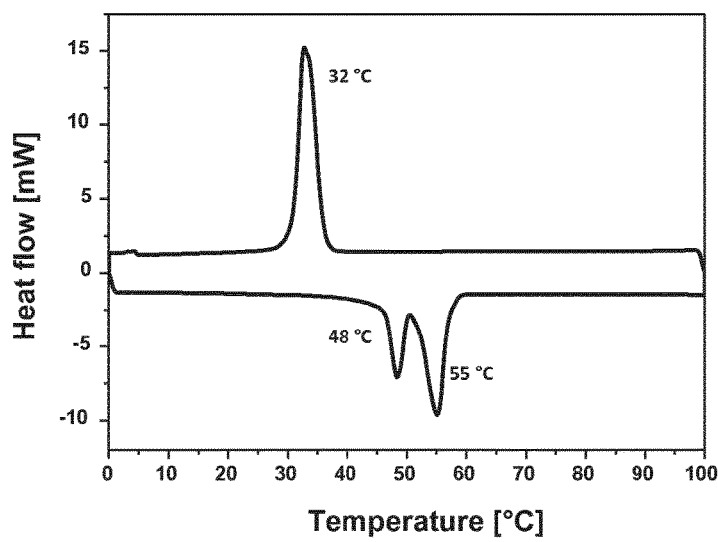
FIG. 3 illustrates DSC traces showing the $2^{nd}$ heating and cooling cycles of neat PBA. The numbers indicate the maxima of the melting/crystallization peaks. The experiments were conducted at heating/cooling rates of 10° C./min.

The first heating trace of the neat PBA-PU shows a broad melting transition with a broad melting peak with a maximum at 47 and a shoulder at 52° C., which indicates the presence of a mixture of α and β polymorphs, recrystallization of the β into the α form around 50° C. and melting of larger a form crystals above 50° C.[47, 52-53] The first cooling trace of the neat PBA-PU shows a crystallization peak that sets in at around 15° C. and has a maximum at 7° C. (FIG. 2). The first DSC heating trace of the neat PBA shows a more narrow melting peak with an onset at 55° C. and a maximum at 62° C. (FIG. 2), while the second heating trace shows two transitions at 48 and 55° C., characteristic of a mixture of β and high temperature a form (FIG. 3). The first cooling curve of the neat PBA shows an onset of the crystallization at 35° C. and a maximum around 28° C. (FIG. 2), while the second cooling curve shows maximum at 32° C. (FIG. 3)

The first heating traces of the PBA-PU/PBA blends with 10, 20, or 30% w/w PBA exhibit a broad melting transition with multiple peaks in the 35-55° C. range and maxima at 52-53° C., indicative of a mixture of α and β forms; interestingly, in the case of the 20% and 30% w/w PBA-PU/PBA blend, the DSC trace suggests a majority of (smaller) α crystals (FIG. 2a, Table 1). Note the absence of the melting peak associated with the neat PBA at a slightly higher temperature. The cooling scans of the PBA-PU/PBA blends each show only one peak, with a maximum at 18, 23 or 29° C. for 10, 20 and 30% w/w PBA-PU/PBA blends, respectively (FIG. 2b, Table 1). Taken together, the results suggest that the incorporation of PBA into PBA-PU increases the crystallization temperature substantially. The mechanism may involve "normal nucleation", in that the unbound or free PBA chains added crystallize first and thus nucleate the less mobile PBA segments in the physically cross-linked PBA-PU. It is also possible that (a portion) of the added PBA reacts with the PBA-PU, for example through trans-esterification or an opening of the urea bonds), leading to either longer PBA chains in this polymer or PBA chain ends, both of which also can serve to nucleate the crystallization of the material (vide infra). Observations that the addition of free polymer can impact the crystallization behavior of an SMP were noted in a previous study of PCL-PU/PCL blends, wherein the size of PCL crystals was shown to decrease with increasing PU content.[54] However, the prior-art study targeted—and demonstrated—a reduction of the PCL melting temperature, and no changes of the crystallization temperature were mentioned. Further, no indication of the mechanism at play was provided.

TABLE 1

Melting ($T_m$) and crystallization ($T_c$) temperatures of the neat PBA-PU and PTHF-PU, their blends with PBA, and the neat PBA.[a]

| Composition | PBA Content (w/w) | $T_m$ (° C.) | $T_c$ (° C.) |
|---|---|---|---|
| PBA | 0% | 62 | 28 |
| PBA-PU | 0% | 47, 52 (shoulder) | 7 |
| PBA-PU/PBA | 10% | 53 | 18 |
|  | 20% | 52 | 23 |
|  | 30% | 54 | 29 |
| PTHF-PU | 0% | 35 | — |
| PTHF-PU/PBA | 10% | 48 | 9 |
|  | 15% | 46 | 17 |
|  | 20% | 49 | 21 |

[a]Determined by DSC at heating and cooling rates of 10° C./min.

Figure 4:
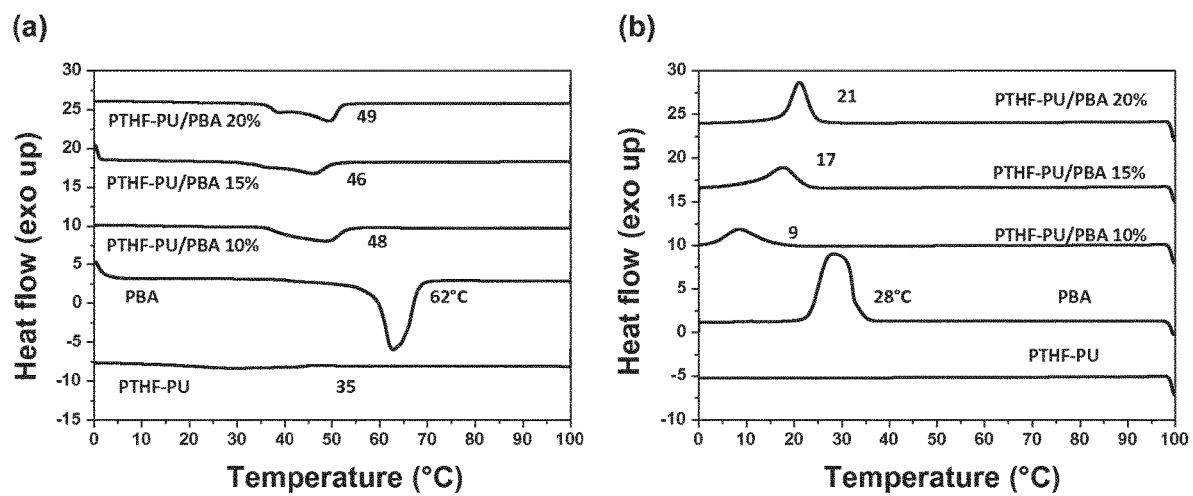
FIG. 4 illustrates DSC traces showing the first heating (a) and the first cooling cycles (b) of the neat PBA, PTHF-PU and its blends with 10, 15 or 20% w/w PBA (a,b). The numbers indicate the maxima of the melting/crystallization peaks. The experiments were conducted at heating/cooling rates of 10° C./min.

The first DSC heating trace of the neat PTHF-PU shows a very weak, broad melting transition in the range of 25-40° C. (FIG. 4a), which is related to the melting of a small fraction of crystallized PTHF segments.[55] The cooling trace of the neat PTHF-PU does not show any crystallization event (FIG. 4b), consistent with the sluggish crystallization of this polymer.

The first DSC heating traces of the PTHF-PU/PBA blends show broad melting transitions between 40 and 52° C. with maxima at 48-49° C. (FIG. 4a, Table 1), indicative of mixtures of PBA α and β crystals. As for the PBA-PU/PBA blends, the melting temperature of the PBA in the PTHF-PU/PBA blends is lower than in the neat PBA. The cooling traces of the PTHF-PU/PBA blends show PBA crystallization peaks between 9° C. (10% w/w PBA) and 21° C. (20% w/w PBA) (FIG. 4b), i.e., at only slightly lower temperatures than in the PBA-PU/PBA blends. Thus, by and large, the thermal transitions of the PBA in the two polyurethanes are very similar, suggesting that the crystallization is primarily driven by the added PBA. Nevertheless, the mobility limiting effect imparted by both polyurethane networks reduces the transition temperatures in comparison to the neat PBA.

Figure 5:
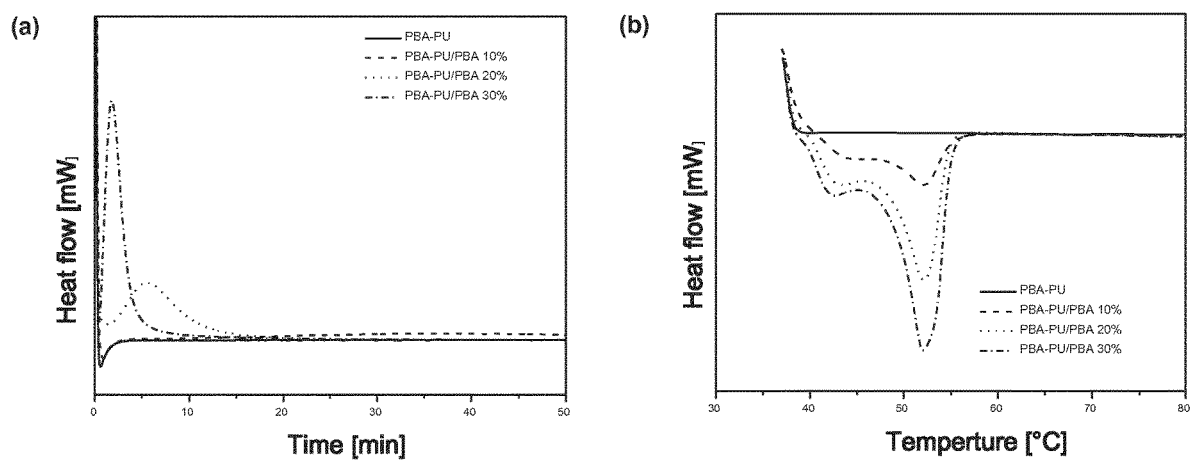
FIG. 5 illustrates (a) the isothermal DSC traces of neat PBA-PU and the PBA-PU/PBA mixtures with 10, 20, 30% w/w PBA at 37° C.; the traces were recorded after first heating the samples to 100° C. and cooling to 37° C.; and (b) subsequent heating traces (recorded after the traces shown in (a) were recorded) from 37° C. to 100° C. (heating rate 10° C./min).

Isothermal DSC studies were undertaken to test the possibility to crystallize the PBU-PU/PBA blends above the $T_c$ established by DSC and in particular at body temperature. Although the crystallization onset measured by DSC for all three compositions (10-30% w/w of PBA) is below 37° C. (FIG. 2), it is known to those skilled in the art that polymers can crystallize when T is $T_c \geq T > T_m$ and the crystallization rate increases as T approaches $T_c$. Thus, the samples were heated in the DSC pan to 100° C., kept at this temperature for 5 min and then quickly (cooling rate −40° C./min) cooled to 37° C. The heat flow at 37° C. was recorded for 50 min (FIG. 5a) and the traces clearly show that, while for the neat PBA-PU no exothermic process takes place within the timeframe of the experiment, for the 10% composition a very broad (i.e. slow) crystallization process is recorded which is further accelerated for the 20 and 30% compositions. The traces suggest that the crystallization of the PBA segments is largely complete after 20 and 10 min for the 20 and 30% w/w blends, respectively. After the isothermal DSC experiments were completed, the samples were further heated from 37° C. up to 100° C. in order to detect the melting of the crystalline domains formed during annealing at 37° C. (FIG. 5b). As expected, no endothermal process was observed for the neat PBA-PU, confirming the inability of the neat poly(ester urethane) to crystallize at 37° C. within a desirable timeframe. Conversely, melting peaks are recorded for the PBA-PU/PBA blends with enthalpies increasing with increasing PBA content, clearly confirming that isothermal crystallization at 37° C. is possible in the case of the materials according to the present invention.

Figure 6:
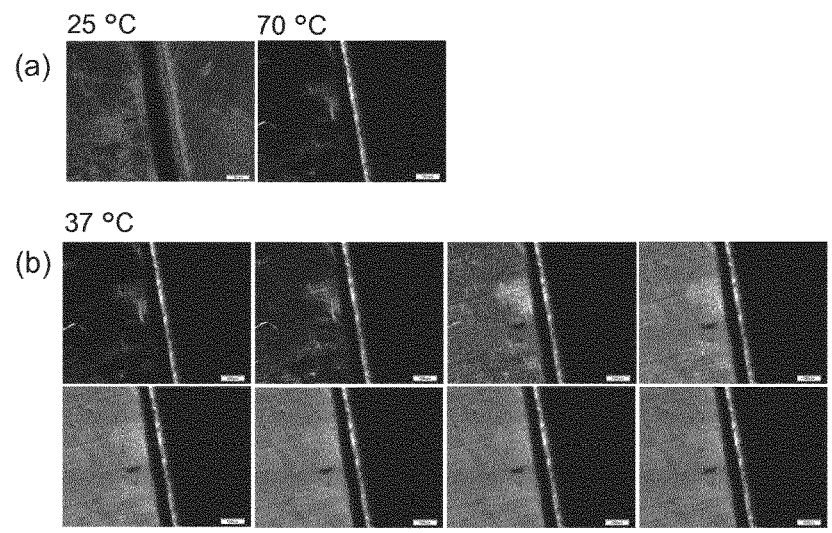
FIG. 6 illustrates polarized optical microscopy images that show a side-by-side comparison of the temperature-induced morphological changes in PBA-PU and a 20% w/w PBA-PU/PBA blend upon heating from 25to 70° C. (a) and as a function of time after subsequent cooling to 37° C. and keeping the samples at this temperature. In all images, the neat PBA-PU is shown on the right side and the 20% w/w PBA-PU/PBA blend on the left. All scale bars shown are 100 μm.

The morphology of PBA-PU, PTHF-PU and their blends with PBA was further probed by optical microscopy under dynamic heating and cooling. A comparison between neat PBA-PU and the PBA-PU/PBA 20% mixture was obtained by placing the two films (one 0.2 mm thick film per composition) side-by-side on a glass slide. The samples were first heated from 25° C. to 70° C. and kept at this temperature for 10 min. Images taken under cross-polarized light show the loss of birefringence for both samples due to the melting of the crystalline PBA segments (FIG. 6a). Next, the samples were cooled to 37° C. and kept at this temperature for 50 min. Cross-polarized micrographs taken at regular time intervals clearly show the rapid formation (10-15 min) of PBA crystallites in the PBA-PU/PBA 20% w/w sample (FIG. 6b, left side of every picture), whereas no crystallization is visible for the neat PBA-PU (FIG. 6b, right side of every picture)

Figure 7:
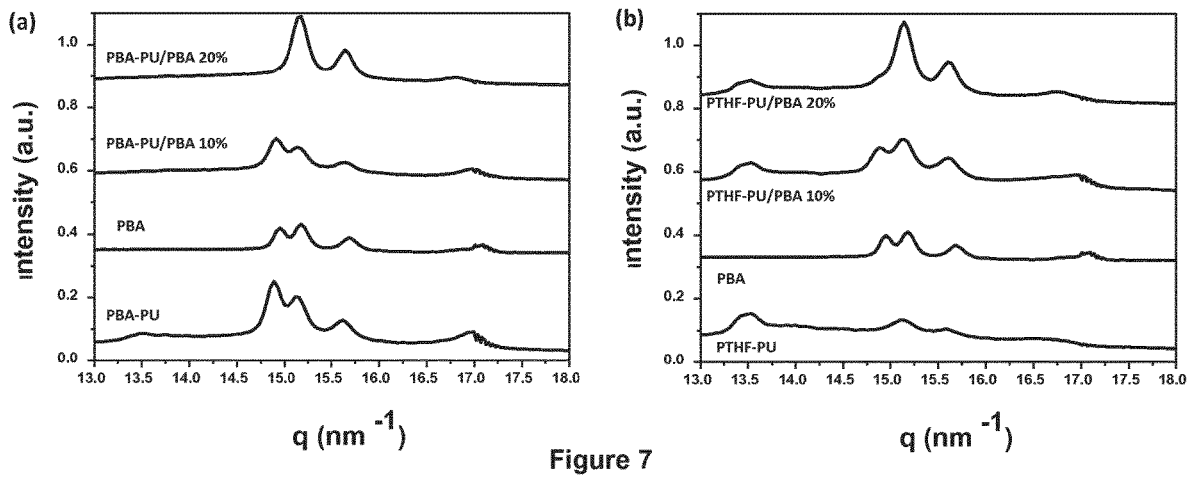
FIG. 7 illustrates WAXS spectra of (a) the neat PBA, PBA-PU, and 10 or 20% w/w PBA-PU/PBA blends; (b) the neat PTHF-PU, PBA, the 10 or 20% w/w PTHF-PU/PBA blends.
Figure 8:
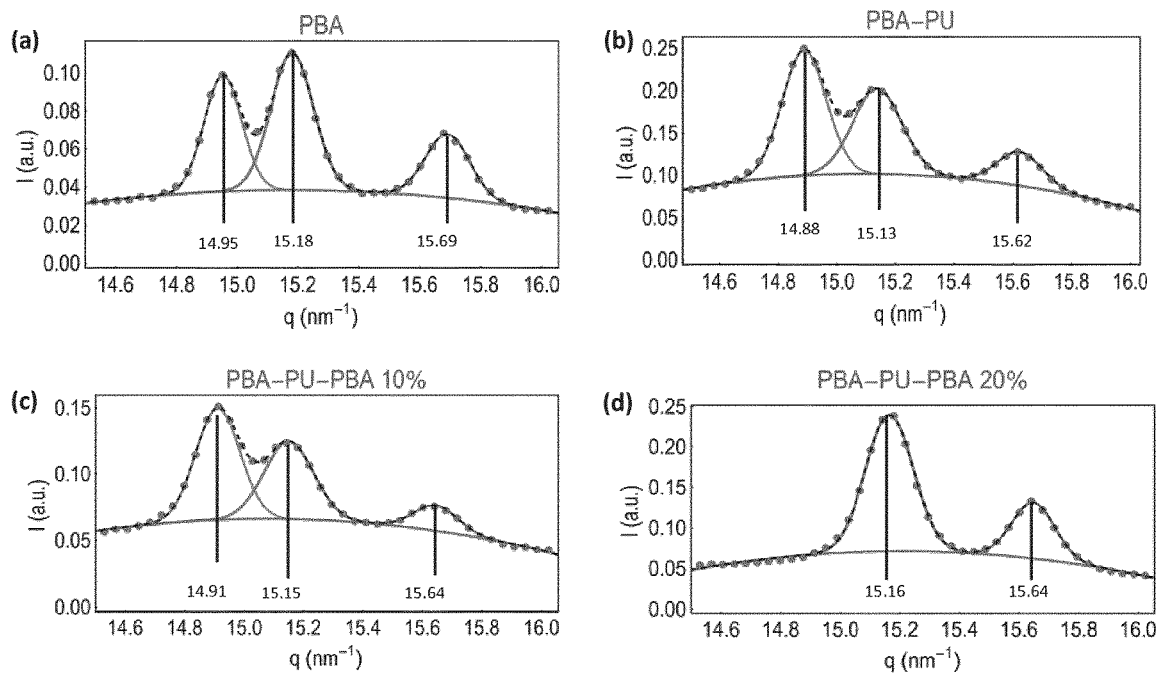
FIG. 8 illustrates WAXS spectra of the neat PBA (a), the neat PBA-PU (b), and blends of 10% w/w (c) and 20% w/w (d) PBA-PU/PBA, respectively. The spectra were fit against a linear combination of a quadratic function interpreting the amorphous halo, and Gaussian functions interpreting the Bragg-reflections from the crystal planes.

FIG. 7 shows the wide-angle X-ray scattering (WAXS) patterns of the neat PBA-PU, PBA, and the PBA-PU blends with 10 or 20% w/w PBA. The spectrum of the neat PBA shows four characteristic peaks with q-values at 14.95, 15.18, 15.69, and 17.14 nm$^{-1}$(FIG. 7a, FIG. 8a), corresponding to a mixture of α and β crystal forms, which is in agreement with a previous report.[52] The WAXS spectrum of PBA-PU shows a similar spectrum (FIG. 8a) and the peak center positions are virtually the same (FIG. 8b); however, the distribution of the scattering intensities is shifted and suggests a higher fraction of β than α crystals. The scattering pattern of the 10% w/w PBA-PU/PBA blend is nearly the same as that of the neat PBA-PU (FIG. 7a, FIG. 8c), whereas the one of the 20% w/w PBA/PBA-PU blend shows a peak pattern that is void of the peaks associated with crystals (FIG. 7a). The WAXS spectrum confirms the presence of only α peaks (FIG. 8d). This suggests that in the 20% w/w PBA-PU/PBA blend, the PBA originally present in the PBA-PU and the added PBA may co-crystallize to form thermodynamically stable α crystallites,[52] on account of the increased content of PBA and the slower crystal growth rate owing to the mobility limiting effect imparted by the PU network. Thus, quite surprisingly, the incorporation of free PBA into the PBA-PU not only leads to an increase of the crystallization temperature, but can also have a significant influence on the crystal structure.

Figure 9:
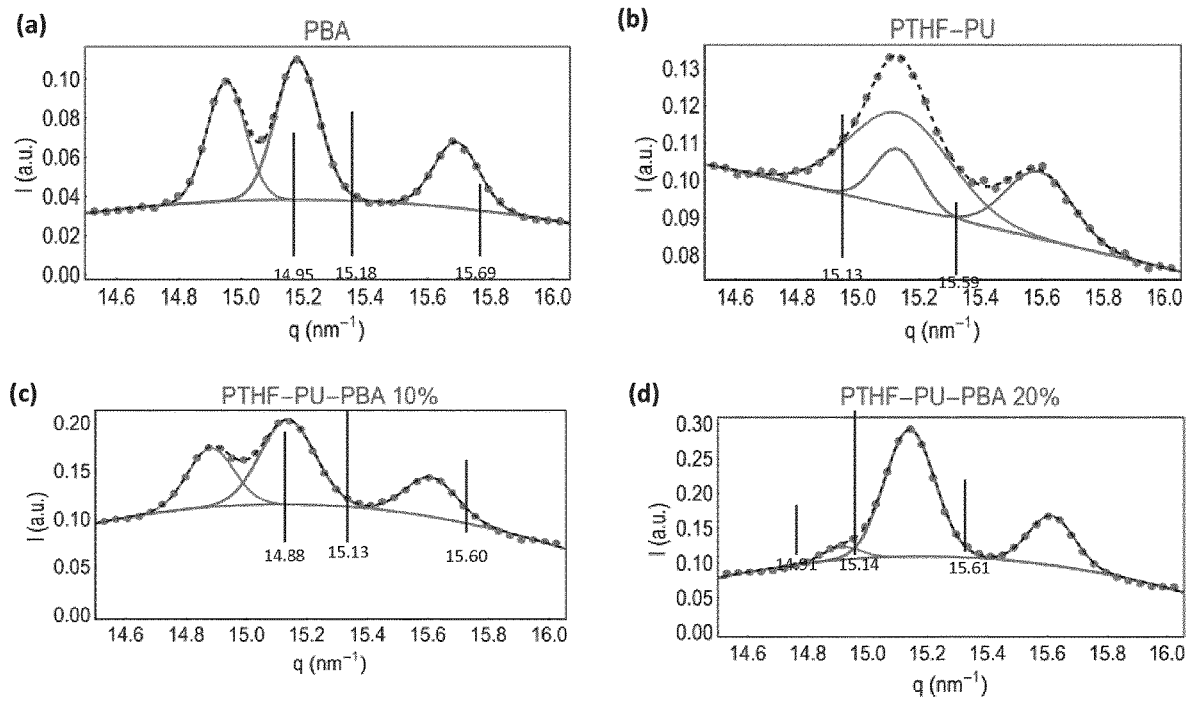
FIG. 9 illustrates WAXS spectra of the neat PBA (a), the neat PTHF-PU (b), and blends of 10% w/w (c) and 20% w/w (d) PTHF-PU/PBA, respectively. The spectra were fit against a linear combination of a quadratic function interpreting the amorphous halo, and Gaussian functions interpreting the Bragg-reflections from the crystal planes.

The WAXS spectrum neat PTHF-PU, shows weak peaks at q-values of 13.51, 15.13 and 15.59 nm$^{-1}$ that are characteristic of the weakly crystalline PTHF phase (FIG. 7b). The spectra of the 10% and 20% w/w PTHF-PU/PBA blends (FIG. 9b) are superpositions of this spectrum and the PBA contributions seen in the corresponding PBA-PU/PBA blends, with a mixture of α and β crystals in the 10% blend, and predominantly α crystals in the 20% w/w PTHF-PU/PBA blend (FIGS. 9c-d). Interestingly, this observation suggests that an increased PBA content in the PU blend favors the formation of α crystals, irrespective of the PU matrix employed. It also shows that the presence of PBA in the majority polymer used is not a sine qua non condition.

Figure 10:
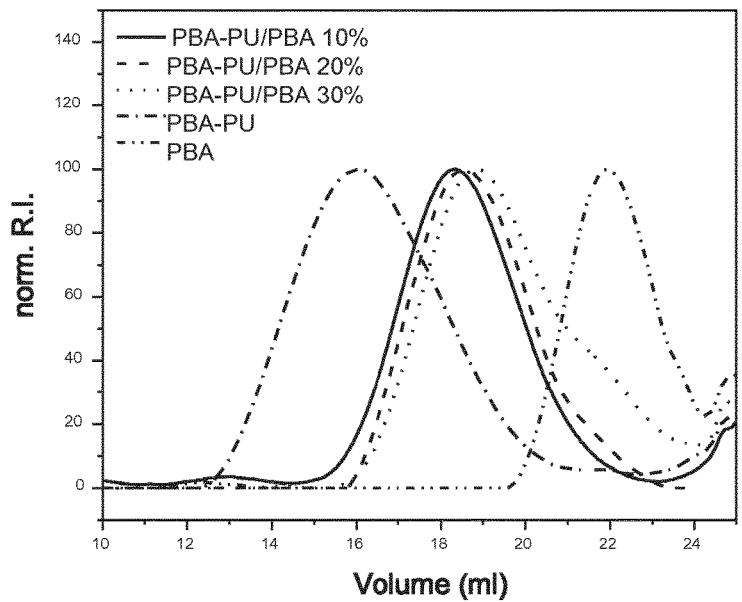
FIG. 10 illustrates size-exclusion chromatography traces (recorded in DMF) of the neat PBA-PU, neat PBA, and three PBA-PU/PBA blends containing 10, 20 and 30% w/w of PBA. The $M_n$, $M_w$ and D extracted from these measurements are: 110,000 g/mol, 229,000 g/mol and 2.08 for the neat PBA-PU; 55,900 g/mol, 103,700 g/mol and 1.8 for the 10% w/w PBA-PU/PBA; 5,000 g/mol, 9,700 g/mol and 1.9 for the PBA.

A comparison of the size exclusion chromatography (SEC) traces of the neat PBA-PU, the neat PBA, and the PBA-PU/PBA blends reveals that the molecular weight of the blends is considerably lower than that of the neat PBA-PU (FIG. 10). The SEC trace for the 10% w/w PBA-PU/PBA blend shows a single peak and no other peaks corresponding to either the neat PBA-PU or the free PBA. This is indicative of a largely complete reaction between the PBA-PU and the PBA, either by way of transesterification, or another reaction. The 10% w/w PBA-PU/PBA blend thus is not a physical mixture or blend, but rather a new polymer that is characterized by $M_n$, $M_w$, and D values of 55,900 g/mol, 103,700 g/mol, and 1.8 respectively. The SEC traces of the 20% and the 30% PBA-PU/PBA blends show a main peak that is similar to that of the 10% w/w PBA-PU/PBA blend, although the retention times are slightly higher (indicating lower molecular weights); in addition, a shoulder at higher retention time us observed, which is more prominent in the 30% w/w PBA-PU/PBA blend and is likely due to the presence of unreacted or "free" PBA. Note that the reduction in molecular weight is not affecting significantly the mechanical properties of the material (vide infra).

Figure 11:
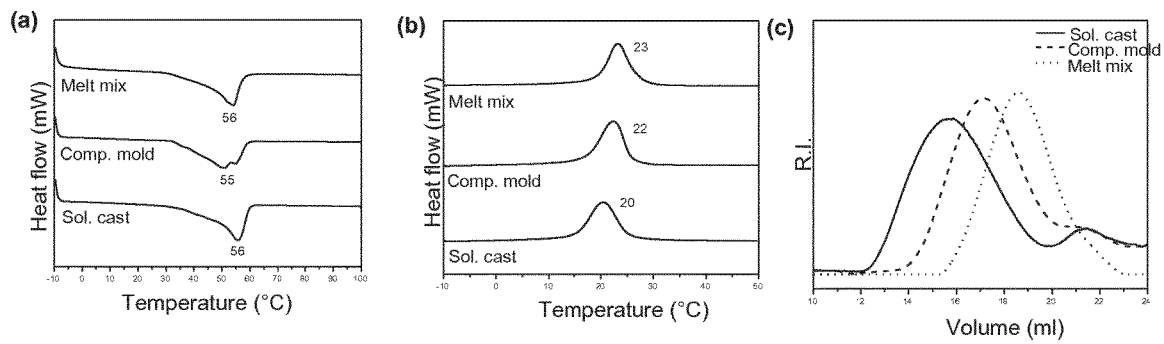
FIG. 11 illustrates the DSC traces showing the first heating (a) and the first cooling cycles (b) of the 20% w/w PBA-PU/PBA mixture prepared by solvent casting, a solvent-cast 20% w/w PBA-PU/PBA film that had been re-molded in a hot press, and a 20% w/w PBA-PU/PBA mixture prepared by melt mixing. (c) Size-exclusion chromatography traces of the 20% w/w PBA-PU/PBA mixture prepared by solvent casting, a solvent cast 20% w/w PBA-PU/PBA film that had been re-molded in a hot press, and a 20% w/w PBA-PU/PBA mixture prepared by melt mixing at 180° C.
Figure 12:
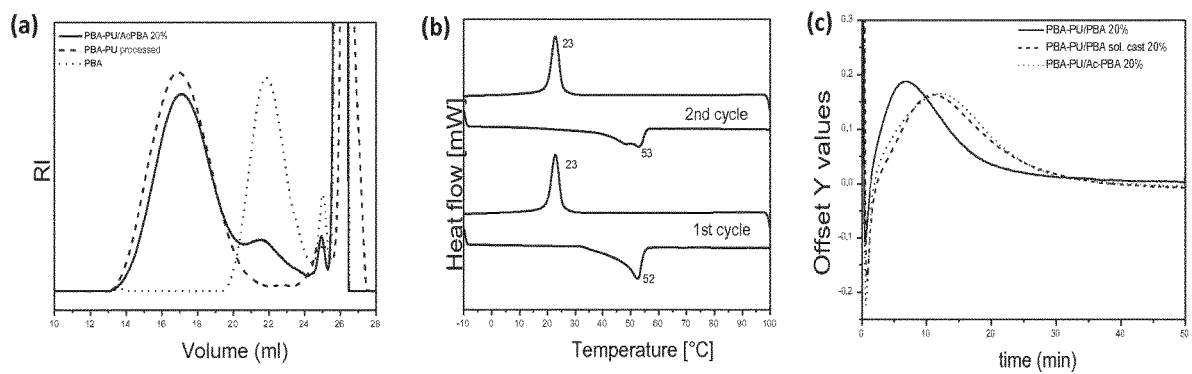
FIG. 12 illustrates (a) The size-exclusion chromatography traces of the 20% w/w PBA-PU/AcPBA mixture prepared by melt-mixing, the neat PBA-PU processed alone using the same protocol, and the neat PBA. (b) DSC traces showing the first and second heating and cooling cycles of the 20% w/w PBA-PU/AcPBA mixture prepared by melt-mixing. (c) Isothermal DSC traces of the melt-mixed and solution-cast 20% w/w PBA-PU/PBA mixtures and the melt-mixed 20% w/w PBA-PU/AcPBA mixture; the traces were recorded after first heating the samples to 100° C. and cooling to 37° C.

These results raise the question whether the desirable thermal properties discovered for the PBA-PU/PBA blends arise from the increase of the PBA content, the presence of free PBA, or if reaction products, which are thought to feature PBA chain ends, could possibly trigger the nucleation. In order to explore this further, we carried out a control experiment on a solution-cast film of a 20% w/w PBA-PU/PBA blend. The sample was prepared by dissolving the two components in tetrahydrofuran, casting into a mould, and drying at moderate temperature. The DSC analysis of the solvent cast film (FIGS. 11a,b) reveals a thermal behavior that is very similar to the one of the corresponding melt-mixed material, featuring a melting peak at 56° C. upon heating and a crystallization peak at 20° C., ca. 3 degrees lower than the melt mixed 20% w/w PBA-PU/PBA (i.e. 23° C.). When the solvent-cast film was re-molded by compression molding at 180° C. for 3 min, the $T_c$ of the material increased to 22° C., suggesting that even a rapid thermal treatment can trigger a reaction between PBA and PBA-PU. Indeed, size exclusion chromatography analyses of the solvent-cast film and the re-molded sample show that, while for the former two distinct peaks corresponding to PBA-PU and PBA are observed, for the latter the thermal treatment causes a shift toward lower molecular weights (FIG. 11c). We also produced a 20% w/w PBA-PU/AcPBA blend by melt-mixing, assuming that the conversion of the hydroxyl end groups of the PBA into acetates (i.e., in AcPBA), should lead to a reduction or suppression of the reaction with the PBA-PU during melt mixing. Indeed, size exclusion chromatography analyses reveal that the melt-mixed 20% w/w PBA-PU/AcPBA blend shows two discrete peaks that overlap with those of the neat PBA-PU (which, for purpose of comparison was also processed in the melt-mixer under identical conditions) and the neat PBA, indicating the absence of any significant reaction between PBA-PU and AcPBA (FIG. 12a). The DSC traces reveal a thermal behavior that is indeed very similar to the one of the corresponding solution cast or melt-mixed materials, featuring a melting peak at 52-53° C. upon heating and a crystallization peak at 23° C. (FIG. 12b). The isothermal DSC experiment at 37° C. is identical to that of the solution-cast film, whereas the crystallization is slightly slower than in the case of the melt-processed 20% w/w PBA-PU/PBA blend (FIG. 12c). The 20% w/w PBA-PU/AcPBA blend displayed excellent fixity (97%) in the $1^{st}$ and $2^{nd}$ cycle when programmed at 37° C. with fixation time of 30 min. Thus based on the findings that (a) the 10% w/w melt-processed PBA-PU/PBA blend, which appears to be void of free PBA but has a reduced molecular weight relative to the neat PBA-PU, (b) the 30% w/w melt-processed PBA-PU/PBA blend, which appears to contain residual free PBA, (c) the solution-cast 20% w/w PBA-PU/PBA and the melt-processed 20% w/w PBA-PU/AcPBA blends, which featured free PBA or AcPBA and shows no significant molecular weight reduction relative to the PBA-PU, all show an increase of $T_c$, which seems to scale with the PBA content, we conclude that it is primarily the increase of the PBA content that drives the crystallization behavior, although it is also well possible that the effect is connected to an increased mobility of the PBA in the "blends" vis a vis the original PBA-PU, either because the PBA added remains free, is (through reaction) placed at chain ends, or has a higher molecular weight than the PBA originally present in the PBA-PU. It is further demonstrated that both melt mixing and solvent-based methods as well as combinations thereof can be employed to prepare shape memory materials according to the present invention and that the molecular weight can be retained or reduced at will.

Figure 13:
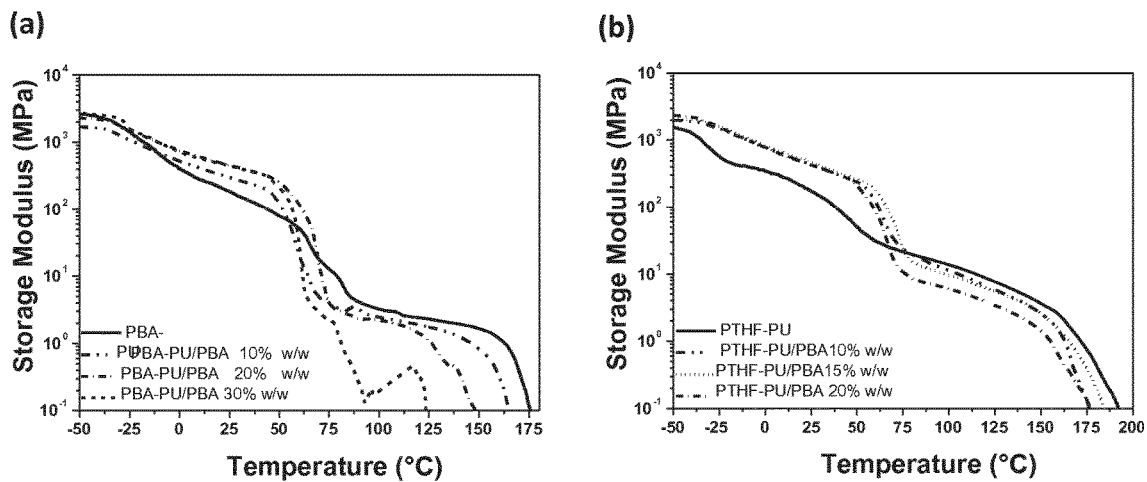
FIG. 13 illustrates dynamic mechanical analysis (DMA) traces of (a) the neat PBA-PU and PBA-PU blends with 10, 20 or 30% w/w PBA and (b) the neat PTHF-PU and PTHF-PU blends with 10, 15 or 20% w/w PBA.

The mechanical properties of the films of the neat PUs and their blends with 10 or 20% w/w PBA were investigated by dynamic mechanical analyses (DMA) in a temperature range of −50 to 200° C. The DMA trace of the neat PBA-PU reveals a gradual reduction of the storage modulus (E') upon heating from −50° C., a sharp, step-like modulus drop around 45-50° C., which is related to the melting of crystalline PBA domains, a rubbery plateau that extends from about 70 to 170° C., and another sharp modulus reduction above this temperature, which is related to the dissociation of the PU's hard segments (FIG. 13a). At 25° C., the binary blends of PBA-PU with PBA (FIG. 13a) display an increased storage modulus vis a vis the neat PBA-PU (150 MPa); the 10% w/w PBA blend exhibits an E' of 403 MPa, whereas a further increase of the PBA content to 20% w/w did not change E' much more (411 MPa) (Table 2). The shape of the DMA trace remained largely unaffected, although the transition associated with the PBA melting seems to become sharper upon introduction of the PBA and the temperature at which the hard phase dissociates decreases with increasing PBA content from ca. 170 to ca. 125° C. Interestingly, in the rubbery plateau (that is above the $T_m$ of the PBA) the E' values of the blends are lower than those of the neat polymers, which can be advantageous as the materials are softer and shaping of a temporary shape is easier.

TABLE 2

Mechanical properties of the neat PUs and their blends with PBA.[a]

| | PBA-PU | | PTHF-PU | |
|---|---|---|---|---|
| | E' 25° C. (MPa) | E' 70° C. (MPa) | E' 25° C. (MPa) | E' 70° C. (MPa) |
| 0% w/w PBA | 150 ± 50 | 14 ± 8 | 178 ± 10 | 13.7 ± 5 |
| 10% w/w PBA | 403 ± 19 | 6 ± 1.3 | 360 ± 27 | 13.2 ± 1.8 |

TABLE 2-continued

Mechanical properties of the neat PUs and their blends with PBA.[a]

| | PBA-PU | | PTHF-PU | |
|---|---|---|---|---|
| | E' 25° C. (MPa) | E' 70° C. (MPa) | E' 25° C. (MPa) | E' 70° C. (MPa) |
| 15% w/w PBA | — | — | 430 ± 31 | 60 ± 0.5 |
| 20% w/w PBA | 370 ± 57 | 31 ± 20 | 381 ± 48 | 15.5 ± 1.4 |
| 30% w/w PBA | 412 ± 35 | 1.9 ± 0.1 | — | — |

[a]All data were collected by dynamic mechanical analyses and represent averages of N = 3-4 individual measurements ± standard deviation.

The DMA trace of the neat PTHF-PU (FIG. 13b) reveals a $T_g$ at ~−30° C., a hint of a $T_m$ associated with melting of a minor fraction of a crystallized soft phase at ~35° C.,[55] a continuous modulus drop up to ~175° C., and a sharp modulus reduction above this temperature, which is related to the melting of the hard segment phase. Blends of PTHF-PU with PBA also show an increase of E' of up to 400 MPa (15 and 20% w/w PBA), and a pronounced step-wise reduction of E due to melting of the PBA crystals appears between 50 and 60° C. (Table 2, FIG. 13b). As for the PBA-PU blends, a reduction, albeit less pronounced, of the hard phase's melting temperature from 190° C. to ~175° C. was observed (FIG. 13b).

Figure 14:
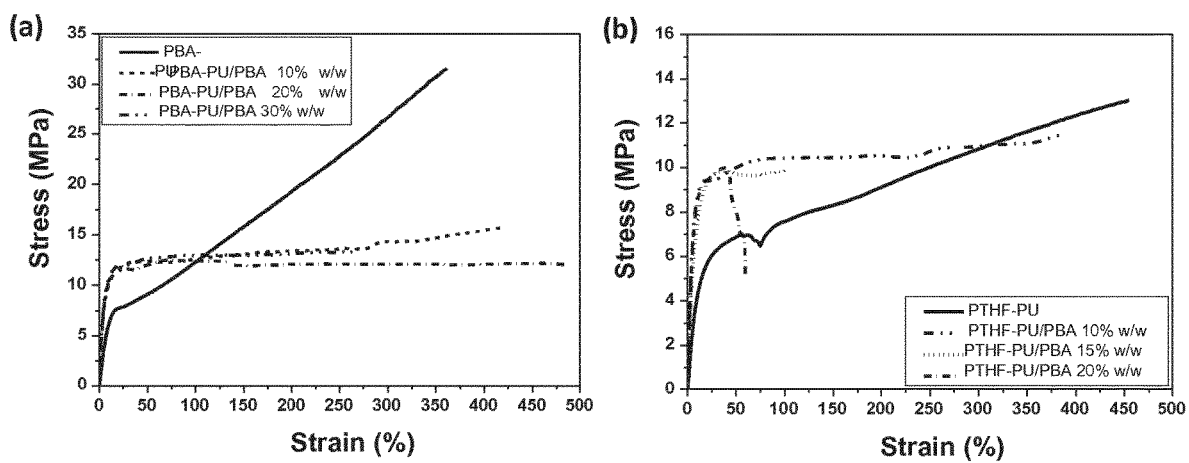
FIG. 14 illustrates stress-strain curves of (a) the neat PBA-PU and PBA-PU blends with 10 or 20% PBA and (b) the neat PTHF-PU and PTHF-PU blends with 10, 15 or 20% w/w PBA.
Figure 15:
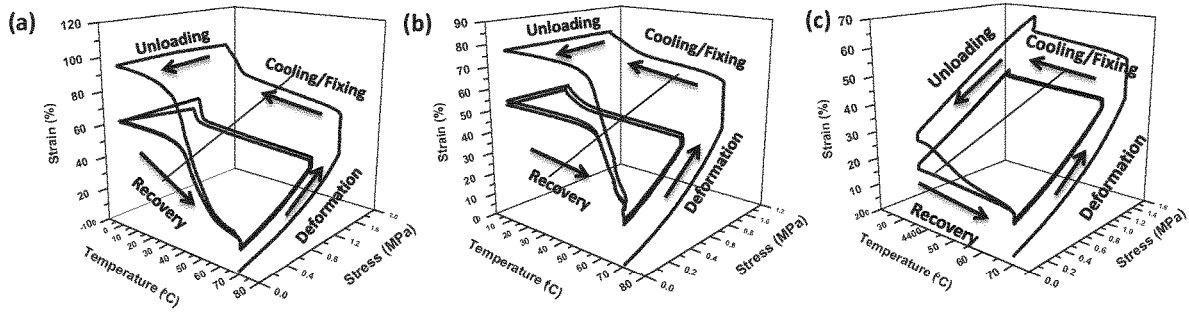
FIG. 15 illustrates cyclic shape memory stress-strain-temperature curves of the neat PBA-PU at a fixing temperature of (a) 0° C., (b) 10° C., (c) 37° C. All cycles were programmed by heating the samples to 70° C. and keeping them isothermal at this stage for 5 min. The samples were then deformed by applying a force (rate=0.8 N·min−1), until a strain of −40% was reached. The deformed samples were subsequently cooled under constant stress to the desired fixing temperature and kept at this stage for 5 (a), 15 (b) or 30 min (c). The applied stress was removed and the samples kept at this stage for another 5 min to adopt the temporary shapes. The shape recovery was initiated by heating the samples back to 70° C. and maintained at this temperature for 10 min for full recovery.

FIG. 14a shows the stress-strain curves of PBA-PU and its blends with PBA acquired at 25° C. The trace of the neat PBA-PU reveals an elastic regime with a Young's modulus of 75 MPa before yielding at a stress and strain of ca. 6.7 MPa and 20%, respectively. The plastic regime shows significant strain hardening and the samples fail at a maximum stress of 30 MPa and an elongation of 360% (Table 3). This mechanical behavior is consistent with the morphology of the neat PBA-PU and reflects a rearrangement of the crystallized PBA segments beyond the yield point. Blending the PBA-PU with 10% w/w PBA led to a significant increase of the Young's modulus (213 MPa) and yield stress (13 MPa), while the elongation at break increased moderately to 400-425% (Table 3); interestingly the strain hardening was completely suppressed, perhaps because of the more localized deformations and reduced chain entanglements on account of the increased crystalline content in the blends.[57] Increasing the concentration of PBA to 20% and 30% did not lead to significant changes of the tensile behavior vis a vis the 10% blend.

The stress-strain curves of PTHF-PU and its blends with PBA are shown in FIG. 14b. The trace of the neat PTHF-PU shows an elastic regime up to 60% with a Young's modulus of 55 MPa and yield stress of c.a. 6.6 MPa and elongation strain at break of 450%. The neat PTHF-PU also shows strain hardening with maximum stress of 13 MPa. A significant increase of the Young's modulus (150 MPa) and yield stress (8.7 MPa) with reduced strain hardening was observed for the 10% w/w PTHF-PU/PBA blend. However, a further increase of the PBA content (20% w/w) in the PTHF-PU blends did not change the Young's modulus significantly but reduced the elongation at break drastically (35%). This could be the result of increased extent of micro-phase separation stemming from the increased PBA content, which leads to inhomogeneous and dislocated deformations and thus the failure in the plastic regime.

TABLE 3

Young's modulus of the neat PBA-PU, PTHF-PU and their blends with PBA[a]

| | PBA-PU | | | PTHF-PU | | |
|---|---|---|---|---|---|---|
| PBA Content (% w)w) | Young's Modulus (MPa) | Yield Stress (MPa) | Maximum Stress (MPa) | Young's Modulus (MPa) | Yield Stress (MPa) | Maximum Stress (MPa) |
| — | 75 ± 10 | 6.7 ± 1 | 23 ± 6.5 | 55 ± 7 | 6.6 ± 0.3 | 12.3 ± 0.9 |
| 10% w/w PBA | 213 ± 31 | 13 ± 1 | 17.7 ± 2.8 | 155 ± 9 | 8.7 ± 0.6 | 11.2 ± 0.3 |
| 15% w/w PBA | — | — | — | 118 ± 24 | 8.0 ± 1.5 | 8.6 ± 0.9 |
| 20% w/w PBA | 196 ± 0.3 | 11.7 ± 0.5 | 12.2 ± 0.6 | 130 ± 14 | 9.8 ± 0.7 | 8.4 ± 2.0 |
| 30% w/w PBA | 209 ± 25 | 11.6 ± 0.6 | 13.5 ± 0.1 | — | — | — |

[a]All data were collected by tensile tests and represent averages of N = 3-5 individual measurements ± standard deviation The shape memory behavior of PBA-PU, PTHF-PU and their respective blends with PBA was investigated on thin films, using a DMA in controlled force mode according to a reported protocol.[27,58] In one set of experiments, the temporary shape was programmed by heating the samples to 70° C., deforming them to either ca. 40% (PBA-PU blends and neat PTHF-PU) or ca. 20% (10% w/w PTHF-PU/PBA blend) strain (based on the mechanical characteristics established by tensile testing), and subsequent cooling under applied stress to a given fixing temperature, which was varied. After maintaining the samples under load at the fixing temperature for typically 5, and in some cases 15 or 30 min, the stress was removed, and the temperature was increased again to 70° C., to release the temporary and (partially) recover the original shape. The cycle was repeated several times. Representative shape memory cycles are shown in FIGS. 15, 16, 17, 18 and 19, while the values for % fixity and % recovery were extracted from $1^{st}$ or $2^{nd}$ and $3^{rd}$ cycles, using Eqs. 1-2 (see Experimental Section), are reported in Tables 4 and 5. Thermoplastic PUs are known to display an incomplete recovery when they are first deformed (notably at elevated temperatures) due to irreversible hard-segment rearrangements, and therefore cyclic shape memory experiments display a large "hysteresis" between the first and subsequent cycles. To take this into account, the first cycle is usually omitted for the analysis.

Figure 16:
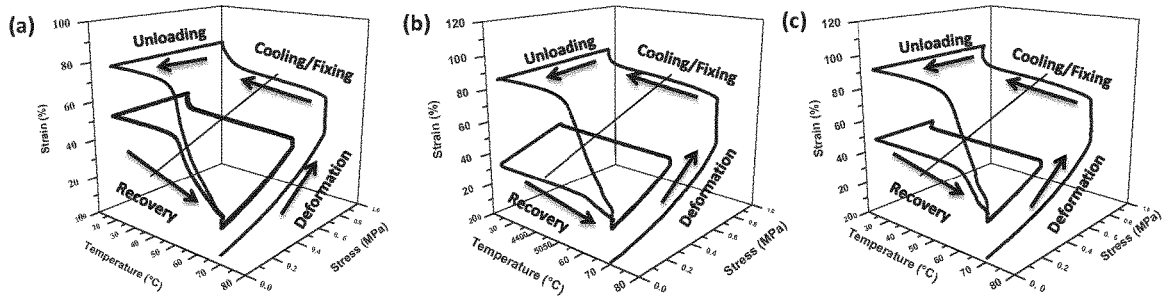
FIG. 16 illustrates cyclic shape memory stress-strain-temperature curves of the 10% w/w PBA-PU/PBA blend (a), (b), (c). Experiments were carried out at a fixing temperature of 10° C. (a), 25° C. (b, c), with fixation times of 5 (a,b) or 15 min (c). All cycles were programmed by heating the samples to 70° C. and keeping them isothermal at this stage for 5 min. The samples were then deformed by applying a force (rate=0.8 N·min$^{-1}$), until a strain of −40% was reached. The deformed samples were subsequently cooled under constant stress to the desired fixing temperature and kept at this stage for 5 (a, b) or 15 min (c). The applied stress was removed and the samples kept at this stage for another 5 min to adopt the temporary shapes. The shape recovery was initiated by heating the samples back to 70° C. and maintained at this temperature for 10 min for full recovery.
Figure 17:
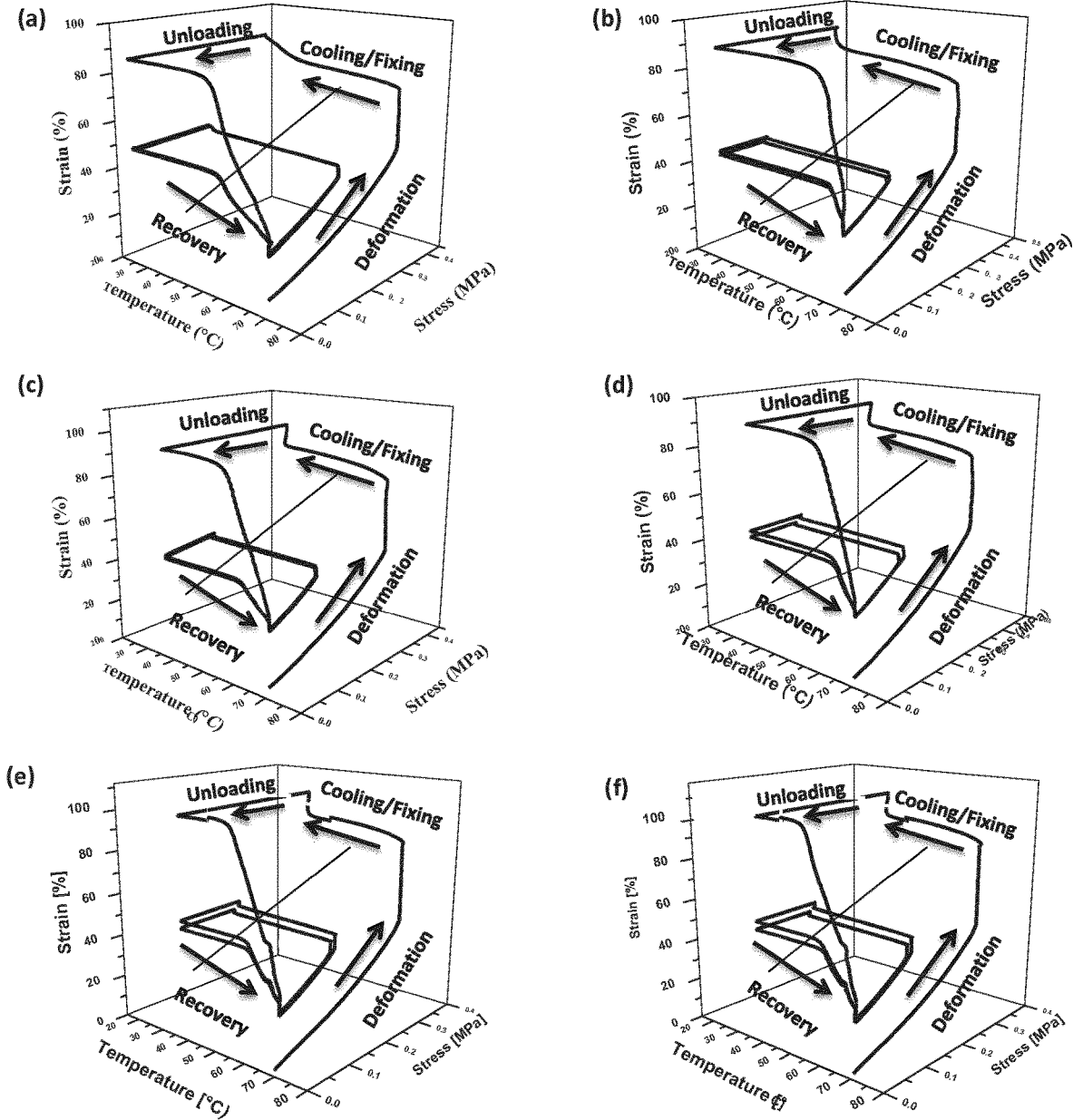
FIG. 17 illustrates cyclic shape memory stress-strain-temperature curves of the 20% w/w PBA-PU/PBA blend (a-d) and the 30% w/w PBA-PU/PBA blend (e-f). Experiments were carried out at a fixing temperature of 25° C. (a), 30° C. (b), or 37° C. (c-f). All cycles were programmed by heating the samples to 70° C. and keeping them isothermal at this stage for 5 min. The samples were then deformed by applying a force (rate=0.8 N·min$^{-1}$) until a strain of −40% was reached. The deformed samples were subsequently cooled under constant stress to the desired fixing temperature and kept at this temperature under load for 5, 15 (b-c), (e), 20 min (f) or 30 min (d). The applied stress was removed and the samples were kept at this temperature for another 5 min to adopt the temporary shapes. The shape recovery was initiated by heating the samples back to 70° C. and maintained at this temperature for 10 min for full recovery.
Figure 18:
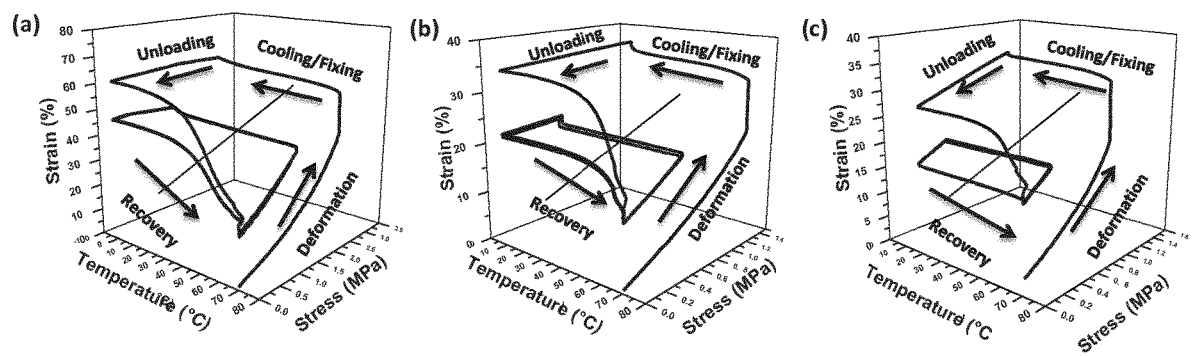
FIG. 18 illustrates cyclic shape memory stress-strain-temperature curves of the neat PTHF-PU (a) and the 10% w/w PTHF-PU/PBA blend (b, c). Experiments were carried out at a fixing temperature of 0° C. (a), 10° C. (b), or 20° C. (c). All cycles were programmed by heating the samples to 70° C. and keeping them isothermal at this stage for 5 min. The samples were then deformed by applying a force (rate=0.8 N·min−1), until a strain of 20% or 40% (a) was reached. The deformed samples were subsequently cooled under constant stress to the desired fixing temperature and kept at this temperature under load for 5 min. The applied stress was removed and the samples were kept at this stage for another 5 min to adopt the temporary shapes. The shape recovery was initiated by heating the samples back to 70° C. and maintained at this temperature for 10 min for full recovery.
Figure 19:
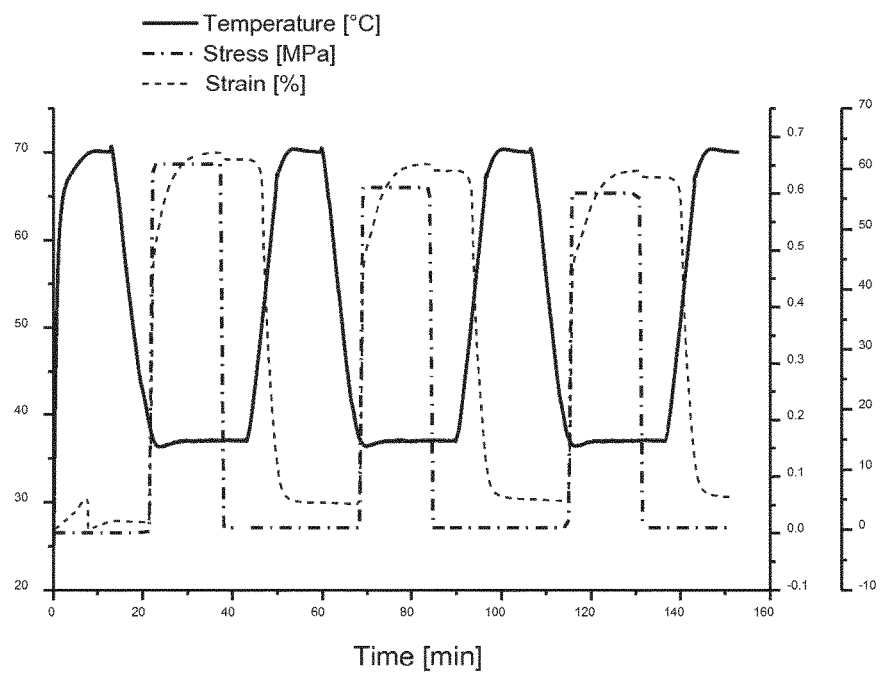
FIG. 19 illustrates another shape memory cycle for the 20% w/w PBA-PU/PBA mixture. In this case, all cycles were programmed by heating the sample to 70° C. and keeping it isothermal at this stage for 5 min. Subsequently the sample was cooled to 37° C. and kept at this temperature for 3 min. The sample was then deformed by applying a force (rate=0.8 N·min−1), until a strain of ca. 60% was reached and kept under load for 15 min. The applied stress was removed and the samples were kept at this stage for another 5 min to adopt the temporary shape. The shape recovery was initiated by heating the samples back to 70° C. and maintaining this temperature for 10 min for full recovery. The calculated shape fixity and recovery are 98 and 97%, respectively.

The neat PBA-PU, outside of the invention, shows an excellent fixity of 98% when programmed for 5 min at a fixation temperature of 0° C. (FIG. 15a, Table 4) indicating efficient PBA crystallization at this temperature as suggested by the $T_c$ established by DSC analysis (7° C.). A similar fixity was observed if the fixation was carried out at 10° C. with an extended fixation time of 15 min (FIG. 15b, Table 4), but if the time was reduced to 5 min, the fixity dropped to 47±1.3. However, when the fixing temperature was increased to 37° C. the fixity was reduced to 42-48%, even at a fixing time of 30 min, whereas the recovery rate was only 57-88% (FIG. 15c, Table 4). The 10% w/w PBA-PU/PBA blend displays a higher crystallization temperature (~18° C., Table 1), which permitted fixation at 20° C. and 25° C. (extended fixation time) with superior fixity value (FIG. 16, Table 4). Increasing the PBA content (20% w/w) further raises the crystallization temperature (DSC shows an onset at ~30° C. and a maximum at 23° C., Table 1) and the 20% w/w PBA-PU/PBA blend showed a fixity of 94% at a fixing temperature of 25° C. (FIG. 17a). Further elevating the fixation temperature to 30° C. yielded an excellent fixity of 98% at a fixation time of 15 min (FIG. 17b). With possible biomedical applications in mind, the fixation temperature was increased to 37° C., and fixity values of 80 and 98% were achieved at fixing times of 15 and 30 min, respectively (FIGS. 17c-d, Table 4). On account of its higher $T_c$ (29° C.), the 30% w/w PBA-PU/PBA blend was able to achieve a good fixity of 96% at 37° C. even with short fixation time of 15 min while the fixity increases further to 98% when the fixation time is extended to 20 min (FIG. 17e-f, Table 4). The data in Table 4 show further that the fixity achieved in the first programming cycle is in all cases comparable to that of subsequent cycles, and that the recovery rate is typically 96% or higher, except for the first cycle data, which the lower recovery rate reflects the intrinsic hysteresis associated with the deformation of pristine PUs. The data also show that the time/temperature required for fixing the temporary shape can be conveniently controlled via the composition of the blend.

TABLE 4

Fixity (%) and recovery (%) ratios of the neat PBA-PU, and its blends with 10, 20, or 30% w/w PBA.[a]

| | Shape fixing temperature (°C) | % fixity (1st cycle) | % recovery (1st cycle) | % fixity (average of 2nd, 3rd cycle) | % recovery (average of 2nd, 3rd cycle) |
|---|---|---|---|---|---|
| PBA-PU | 0 | 98 ± 0.7 | 85 ± 0.2 | 98 ± 1.0 | 98 ± 0.2 |
| | 10[b] | 98 ± 0.1 | 75 ± 4.5 | 98 ± 0.1 | 97 ± 0.6 |
| | 37[c] | 48 | 57 | 42 | 88 |
| 10% w/w PBA-PU/PBA | 20 | 98 ± 0.5 | 78 ± 1.6 | 97 ± 0.5 | 97 ± 1.0 |
| | 25 | 95 ± 0.3 | 76 ± 0.8 | 45 ± 0.6 | 97 ± 1.8 |
| | 25[b] | 97 ± 0.6 | 75 ± 0.2 | 96 ± 1.6 | 97 ± 1.2 |
| 20% w/w PBA-PU/PBA | 25 | 98 ± 0.9 | 72 ± 1.9 | 94 ± 1.5 | 96 ± 1.0 |
| | 30 | 97 ± 1.8 | 64 ± 0.3 | 27 ± 1.4 | 94 ± 0.9 |
| | 30[b] | 98 ± 1.3 | 67 ± 1.0 | 98 ± 0.4 | 96 ± 2.8 |
| | 37[b] | 97 ± 0.5 | 68 ± 1.8 | 80 ± 1.1 | 95 ± 0.5 |
| | 37[c] | 98 ± 0.2 | 69 ± 0.6 | 98 ± 0.2 | 98 ± 0.5 |
| 30% w/w PBA-PU/PBA | 37[b] | 99 | 77 | 96 ± 0.3 | 97 ± 1.0 |
| | 37[d] | 99 | 78 | 98 ± 0.5 | 97 ± 1.1 |

[a]All data were collected by dynamic mechanical analyses and represent averages of N = 3 individual measurements ± standard deviation.
The fixation time was 5 min.
[b]The fixation time was extended to 15 min.
[c]fixation time was extended to 30 min.
[d]the fixation time was 20 min.
The % fixity and % recovery were extracted from the 1st and the 2nd and 3rd cycles, respectively.

Thus, blending PBA-PU with PBA indeed affords shape memory materials in which a temporary shape can be programmed at a substantially higher temperature than in the case of the neat PBA; notably, excellent shape fixity can be achieved at physiological temperature. Eliminating the hysteresis effect[59-60] in the first shape memory cycles, recovery ratios extracted from 2nd and 3rd cycles were excellent (95-98%) for the neat PBA-PU and its blends with PBA (Table 4).

The neat PTHF-PU was deformed up to 40% strain and cooled to 0° C. for temporary shape fixation (as no crystallization peak could be discerned in DSC), PTHF-PU shows good fixity of 96% at this temperature (FIG. 18a, Table 5). The 10% w/w of PTHF-PU/PBA blend was deformed up to 20% strain and the deformed shape was fixed either at 10° C. (crystallization temperature) or 20° C. (ambient temperature). The blend displayed good fixity of 95% in the first and the consecutive cycles at 10° C. (FIG. 18b, Table 5), however at 20° C. better fixity (85%) in the first cycle and a lower fixity (38%) was observed in the consecutive cycles, which can be explained by the lower content and the crystallization temperature of the PBA (FIG. 18c, Table 5).

TABLE 5

Fixity (%) and recovery (%) ratios of the neat PTHF-PU, and its blends with 10, 15, or 20% w/w PBA.[a]

| | Shape fixing temperature (°C.) | % fixity (1st cycle) | % recovery (1st cycle) | % fixity (average of 2nd, 3rd cycle) | % recovery (average of 2nd, 3rd cycle) |
|---|---|---|---|---|---|
| PTHF-PU | 0 | 97 ± 0.7 | 68 ± 0.8 | 96 ± 0.7 | 97 ± 0.9 |
| 10% w/w PTHF-PU/PBA | 10 | 95 ± 0.4 | 63 ± 0.5 | 95 ± 1.1 | 98 ± 0.6 |
| | 20 | 85 ± 5.0 | 40 ± 3.0 | 38 ± 3.5 | 89 ± 5.0 |

[a]All data were collected by dynamic mechanical analyses and represent averages of N = 3 individual measurements ± standard deviation.
The % fixity and % recovery were extracted from 1st, 2nd and 3rd cycles.

An alternative shape memory cycle was also used to investigate the behavior when deforming the materials only after first cooling them to the fixing temperature. This protocol is perhaps better suited to characterize the behavior under practically useful conditions where an object or device containing the shape-memory material is (i) heated above the transition temperature ($T_m$) to soften the material, (ii) is cooled to a temperature low enough as to cause no harm or discomfort when inserted in or around the body, and (iii) is positioned in the deployment position where the material adapts its shape to the surrounding environment (i.e. stress is applied) at the body temperature (i.e. 37° C.). As for the shape memory test described above, the cyclic tests start with the sample being heated to 70° C. and being kept at this temperature for 5 min.

The samples were then cooled to 37° C. (rate 5° C./min) to simulate the deployment of an object or a device, and kept at this temperature for 2 min. The samples were then uniaxially deformed, as described above, and kept under load isothermally for 15 min. After the removal of the stress, the cycle proceeded as for the conventional cycle. Gratifyingly, the revised shape-memory cycle recorded for the 20% w/w PBA-PU/PBA blend (FIG. 19) allows to achieve excellent fixity and recovery of 98 and 97%, respectively. Moreover, due to the deformation occurring at lower temperature, the alternative shape memory cycle does not suffer from the pronounced hysteresis observed during the first cycle on the standard shape-memory tests.

Figure 20:
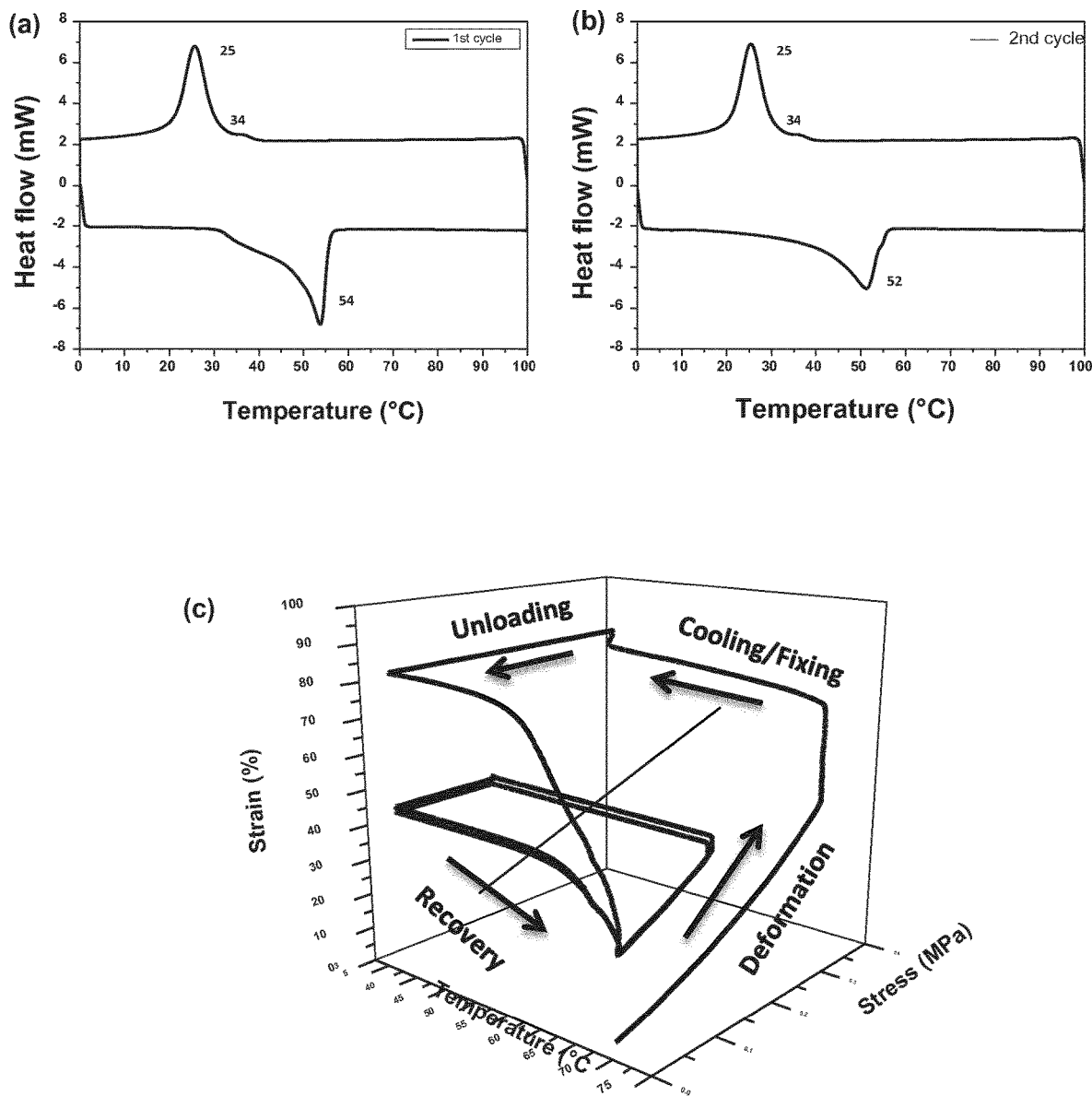
FIG. 20 illustrates DSC traces showing the first (a) and second (b) heating and cooling cycles of the 30% w/w PBA-PU/PCL mixture prepared by melt-mixing. (c) Cyclic shape memory stress-strain-temperature curves of the 30% w/w PBA-PU/PCL mixture at a fixing temperature of 37° C. (with fixation time of 30 min).

To demonstrate broader applicability of the invention, we also created melt-mixed blends or PBA-PU and PCL of $M_w/M_n$ of 14,000/12,000 g·mol$^{-1}$. For example, the 30% w/w PBA-PU/PCL mixture shows a $T_m$ of 54 and 52° C. in the first and second DSC heating cycle and a $T_c$ of 25° C. in the first and second cooling cycle, with a small shoulder around 35° C. (FIGS. 20a, b). While the latter is indicative of free PCL, the crystallization peak centered around 25° C. reveals that the crystallization temperature of the PBA segments in the PBA-PU can also be increased by using PCL as a modifier polymer. The 30% w/w PBA-PU/PCL mixture shows an excellent fixity of 98% ($1^{st}$ cycle) and 97% ($2^{nd}$ cycle) when programmed for 30 min at a fixation temperature of 37° C. (FIG. 20c) indicating efficient PBA crystallization at this temperature.

To demonstrate the technical applicability of the invention in an example, an earpiece, that is the in-ear-part of a hearing aid device, was produced by injection-molding the 20% w/w PBA-PU/PBA blend using a suitable mould. Reference earpieces were also made from the neat PBA-PU. The coupling of hearing devices and especially the earpiece component thereof to the ear is of great importance for the acoustic performance of the hearing device and also the wearing comfort. The anatomy of the ear canal varies between individuals and customizing earpieces so that they fit to the geometry of the user's ear canal is considered of great importance. This could readily be achieved by using the PU-PBA/PBA blend according to the present invention. The earpiece was heated to 70° C. in an oven, removed, and within 1 min inserted into an individual's ear. After 15 min, the earpiece was removed from the ear end clearly remained in the shape that was programmed by the process. By contrast, a reference experiment with the neat PU-PBA under the same conditions showed that shape fixation at body temperature is not possible with the prior-art material.

In summary, we have shown that the thermal, mechanical and shape memory properties of a commercially available shape memory poly(ester urethane) with crystallizable switching segments (PBA-PU) can be modified by formulating this material with a commercially accessible, crystalline modifier. Most interestingly, incorporating free PBA into PBA-PU increased the shape fixing temperature from 10° C. to 37° C., which is very beneficial for the utilization of such material in biomedical applications. This effect is general and could be used to increase the fixing temperature of PTHF-PU blends with PBA. Simple melt-mixing process was utilized to formulate the blends, which affords an easy route for the property modification of existing SMPs and upscaling of such materials for the technological applications.

For the avoidance of doubt, the compositions of the present invention encompass all possible combinations of the components, including various ranges of said components, disclosed herein. It is further noted that the term "comprising" does not exclude the presence of other elements. However, it is to also be understood that a description of a product or composition comprising certain components also discloses a product consisting of said components. Similarly, it is also to be understood that a description of a process comprising certain steps also discloses a process consisting of the steps.

While in accordance with the patent statutes the best mode and preferred embodiment have been set forth, the scope of the invention is not intended to be limited thereto, but only by the scope of the attached claims.

REFERENCES

1. Liu, C.; Qin, H.; Mather, P. Review of Progress in Shape-Memory Polymers. *J. Mater. Chem.* 2007, 17, 1543.
2. Shahinpoor, M.; Schneider, H.-J. Intelligent Materials. RSC Publishing: Cambridge 2008.
3. Lendlein, A.; Kelch, S. Shape-Memory Polymers. *Angew. Chem. Int. Ed.* 2002, 41, 2034.
4. Lendlein, A.; Langer, R. Biodegradable, Elastic Shape-Memory Polymers for Potential Biomedical Applications. *Science* 2002, 296, 1673.
5. Hager, M. D.; Bode, S.; Weber, C.; Schubert, U. S. Shape Memory Polymers: Past, Present and Future Developments. *Prog. Polym. Sci.* 2015.
6. Mather, P. T.; Luo, X.; Rousseau, I. A. Shape Memory Polymer Research. *Ann. Rev Mater Res.* 2009, 39, 445.
7. Hu, J.; Zhu, Y.; Huang, H.; Lu, J. Recent Advances in Shape—Memory Polymers: Structure, Mechanism, Functionality, Modeling and Applications. *Prog. Polym. Sci.* 2012, 37, 1720.
8. Garle, A.; Kong, S.; Ojha, U.; Budhlall, B. M. Thermoresponsive Semicrystalline Poly(ε-Caprolactone) Networks: Exploiting Cross-Linking with Cinnamoyl Moieties to Design Polymers with Tunable Shape Memory. *ACS Appl. Mater. Interfaces* 2012, 4, 645.
9. Rivero, G.; Nguyen, L.-T. T.; Hillewaere, X. K. D.; Du Prez, F. E. One-Pot Thermo-Remendable Shape Memory Polyurethanes. *Macromolecules* 2014, 47, 2010.
10. Yu, K.; Qi, H. J. Temperature Memory Effect in Amorphous Shape Memory Polymers. *Soft Matter* 2014, 10, 9423.
11. Lendlein, A.; Jiang, H.; Jünger, O.; Langer, R. Light-Induced Shape-Memory Polymers. *Nature* 2005, 434, 879.
12. Ikeda, T.; Mamiya, J.-i.; Yu, Y. Photomechanics of Liquid-Crystalline Elastomers and Other Polymers. *Angew. Chem. Int. Ed.* 2007, 46, 506.
13. Han, X. J.; Dong, Z. Q.; Fan, M. M.; Liu, Y.; Wang, Y. F.; Yuan, Q. J.; Li, B. J.; Zhang, S. Ph-Induced Shape-Memory Polymers. *Macromol. Rapid Commun.* 2012, 33, 1055.
14. Ang, J. Y.; Chan, B. Q. Y.; Kai, D.; Loh, X. J. Engineering Porous Water-Responsive Poly (PEG/PCUPDMS Urethane) Shape Memory Polymers. *Macromole. Mater. Eng.* 2017.
15. Yakacki, C. M.; Shandas, R.; Lanning, C.; Rech, B.; Eckstein, A.; Gall, K. Unconstrained Recovery Characterization of Shape-Memory Polymer Networks for Cardiovascular Applications. *Biomaterials* 2007, 28, 2255.
16. Chan, B. Q. Y.; Low, Z. W. K.; Heng, S. J. W.; Chan, S. Y.; Owh, C.; Loh, X. J. Recent Advances in Shape Memory Soft Materials for Biomedical Applications. *ACS Appl. Mater. Interfaces* 2016, 8, 10070.
17. Jeong, H.; Kim, B.; Choi, Y. Synthesis and Properties of Thermotropic Liquid Crystalline Polyurethane Elastomers. *Polymer* 2000, 41, 1849.
18. Koerner, H.; Price, G.; Pearce, N. A.; Alexander, M.; Vaia, R. A. Remotely Actuated Polymer Nanocomposites—Stress-Recovery of Carbon-Nanotube-Filled Thermoplastic Elastomers. *Nat. mater.* 2004, 3, 115.
19. Gall, K.; Dunn, M. L.; Liu, Y.; Stefanic, G.; Balzar, D. Internal Stress Storage in Shape Memory Polymer Nanocomposites. *Appl. Phys. Lett.* 2004, 85, 290.
20. Khonakdar, H. A.; Jafari, S. H.; Rasouli, S.; Morshedian, J.; Abedini, H. Investigation and Modeling of Temperature Dependence Recovery Behavior of Shape-Memory Crosslinked Polyethylene. *Macromol. Theory Simul.* 2007, 16, 43.

21. Rousseau, I. A. Development of Soft Polymeric Networks Showing Actuation Behavior: From Hydrogels to Liquid Crystalline Elastomers. Digitalcommons.uconn.edu, 2004.
22. Lin, J.; Chen, L. Study on Shape-Memory Behavior of Polyether-Based Polyurethanes. li. Influence of Soft-Segment Molecular Weight. *J. Appl. Polym. Sci.* 1998, 69, 1575.
23. Xu, J.; Shi, W.; Pang, W. Synthesis and Shape Memory Effects of Si—O—Si Cross-Linked Hybrid Polyurethanes. *Polymer* 2006, 47, 457.
24. Leng, J.; Lan, X.; Liu, Y.; Du, S. Shape-Memory Polymers and Their Composites: Stimulus Methods and Applications. *Prog. Mater Sci.* 2011, 56, 1077.
25. Liu, Y.; Du, H.; Liu, L.; Leng, J. Shape Memory Polymers and Their Composites in Aerospace Applications: A Review. *Smart Mater. Struct.* 2014, 23, 023001.
26. Lan, X.; Liu, Y.; Lv, H.; Wang, X.; Leng, J.; Du, S. Fiber Reinforced Shape-Memory Polymer Composite and Its Application in a Deployable Hinge. *Smart Mater. Struct.* 2009, 18, 024002.
27. Shirole, A.; Sapkota, J.; Foster, E. J.; Weder, C. Shape Memory Composites Based on Electrospun Poly(Vinyl Alcohol) Fibers and a Thermoplastic Polyether Block Amide Elastomer. *ACS Appl. Mater. Interfaces* 2016, 8, 6701.
28. Mohr, R.; Kratz, K.; Weigel, T.; Lucka-Gabor, M.; Moneke, M.; Lendlein, A. Initiation of Shape-Memory Effect by Inductive Heating of Magnetic Nanoparticles in Thermoplastic Polymers. *Proc. Natl. Acad. Sci. USA* 2006, 103, 3540.
29. Zou, H.; Weder, C.; Simon, Y. C. Shape-Memory Polyurethane Nanocomposites with Single Layer or Bilayer Oleic Acid-Coated $Fe_3O_4$ Nanoparticles. *Macromol. Mater. Eng.* 2015, 300, 885.
30. Liu, Y.; Li, Y.; Chen, H.; Yang, G.; Zheng, X.; Zhou, S. Water-Induced Shape-Memory Poly(D,L-Lactide)/Microcrystalline Cellulose Composites. *Carbohydr. Polym.* 2014, 104, 101.
31. Mendez, J.; Annamalai, P. K.; Eichhorn, S. J.; Rusli, R.; Rowan, S. J.; Foster, E. J.; Weder, C. Bioinspired Mechanically Adaptive Polymer Nanocomposites with Water-Activated Shape-Memory Effect. *Macromolecules* 2011, 44, 6827.
32. Mather, P. T.; Liu, C.; Campo, C. J. Blends of Amorphous and Semicrystalline Polymers Having Shape Memory Properties. U.S. Pat. No. 7,371,799 B2, May 13, 2008.
33. Meng, Q.; Hu, J. A Review of Shape Memory Polymer Composites and Blends. *Composites Part A: Appl Sci Manufac.* 2009, 40, 1661.
34. Behl, M.; Ridder, U.; Feng, Y.; Kelch, S.; Lendlein, A. Shape-Memory Capability of Binary Multiblock Copolymer Blends with Hard and Switching Domains Provided by Different Components. *Soft Matter* 2009, 5, 676.
35. Li, S. C.; Lu, L. N.; Zeng, W. Thermostimulative Shape-Memory Effect of Reactive Compatibilized High-Density Polyethylene/Poly (Ethylene Terephthalate) Blends by an Ethylene—Butyl Acrylate—Glycidyl Methacrylate Terpolymer. *J. Appl. Polym. Sci.* 2009, 112, 3341.
36. Weiss, R. A., E. Izzo, and S. Mandelbaum. New design of shape memory polymers: mixtures of an elastomeric ionomer and low molar mass fatty acids and their salts. *Macromolecules,* 2008, 41, 2978.
37. Zhang, H., Wang, H., Zhong, W., Du, Q. A novel type of shape memory polymer blend and the shape memory mechanism. *Polymer,* 2009, 50, 1596.
38. Zhang, W.; Chen, L.; Zhang, Y. Surprising Shape-Memory Effect of Polylactide Resulted from Toughening by Polyamide Elastomer. *Polymer* 2009, 50, 1311.
39. Jeong, H. M., Ahn, B. K. Kim, B. K. Miscibility and Shape Memory Effect of ThermoplasticPolyurethane Blends with Phenoxy Resin. *Eur. Polym. J.* 37(11), 2245.
40. Jeong, H. M.; Song, J. H.; Lee, S. Y.; Kim, B. K. Miscibility and Shape Memory Property of Poly (Vinyl Chloride)/Thermoplastic Polyurethane Blends. *J. mater. Sci.* 2001, 36, 5457.
41. Zhang, L.; Huang, M.; Yu, R.; Huang, J.; Dong, X.; Zhang, R.; Zhu, J. Bio-Based Shape Memory Polyurethanes (Bio-SMPUs) with Short Side Chains in the Soft Segment. *J.f Mater. Chem. A* 2014, 2, 11490.
42. Singhal, P.; Small, W.; Cosgriff-Hernandez, E.; Maitland, D. J.; Wilson, T. S. Low Density Biodegradable Shape Memory Polyurethane Foams for Embolic Biomedical Applications. *Acta Biomater.* 2014, 10, 67.
43. Pudleiner, H.; Meyer, K.; Winkler, J.; Braeuer, W.; Nickel, J.; Pehlert, C. Multi-Layer Film with Improved Modulus Properties. US20150140300 A1, May 21, 2015
44. Bouaziz, R.; Roger, F.; Prashantha, K. Thermo-Mechanical Modeling of Semi-Crystalline Thermoplastic Shape Memory Polymer under Large Strain. *Smart Mater. Struct.* 2017, 26, 055009.
45. Lowe, R.; Kruger, P.; Knebel, M.; Ehreke, J.; Pudleiner, H.; Yesildag, M. C.; Meyer, K.; Pophusen, D.; Büchner, J. Latent-Reactively Glued TPU/PC Layer Materials. US8911851 B2, Dec. 16, 2014.
46. Ecker, M.; Pretsch, T. Novel Design Approaches for Multifunctional Information Carriers. *RSC Adv.* 2014, 4, 46680.
47. Bothe, M.; Emmerling, F.; Pretsch, T. Poly (Ester Urethane) with Varying Polyester Chain Length: Polymorphism and Shape-Memory Behavior. *Macromol. Chem. Phys.* 2013, 214, 2683.
48. Mirtschin, N.; Pretsch, T. Designing Temperature-Memory Effects in Semicrystalline Polyurethane. *RSC Adv.* 2015, 5, 46307.
49. Fritzsche, N.; Pretsch, T. Programming of Temperature-Memory Onsets in a Semicrystalline Polyurethane Elastomer. *Macromolecules* 2014, 47, 5952.
50. Shirole, A.; Nicharat, A.; Weder, C.; Tailoring The Properties of Shape Memory Poly(Ester Urethane) by Nanocomposite Formation and Nucleation, manuscript submitted.
51. Liu, Li-Zhi, Fengji Yeh, and Benjamin Chu. Synchrotron SAXS Study of Crystallization and Microphase Separation in Compatible Mixtures of Tetrahydrofuran—Methyl Methacrylate Diblock Copolymer and Poly (tetrahydrofuran). *Macromolecules* 1996, 29, 5336.
52. Woo, E. M.; Wu, M. C. Thermal and X-Ray Analysis of Polymorphic Crystals, Melting, and Crystalline Transformation in Poly (Butylene Adipate). *J. Polym. Sci., Part B: Polym. Phys.* 2005, 43, 1662.
53. Wang, M.; Tashiro, K.; Ozaki, Y. Reinvestigation of the β to α Crystal Phase Transition of Poly(Butylene Adipate) by the Time-Resolved X-Ray Scattering and FTIR Spectral Measurements in the Temperature-Jump Process. *Macromolecules* 2017, 50, 3883
54. Ajili, S. H., Ebrahimi, N. G. and Soleimani, M. Polyurethane/Polycaprolactane Blend With Shape Memory Effect as a Proposed Material for Cardiovascular Implants. *Acta biomaterialia,* 2009, 5(5), 1519.
55. Tanghe, L. M., Goethals, E. J. and Du Prez, F. Segmented Polymer Networks Containing Amino-Dendrimers. *Polym. intl,* 2003,52(2), 191.
55. Li, Y., Bai, T., Li, Y. and Ling, J. Branched Polytetrahydrofuran and Poly (tetrahydrofuran-co-ε-caprolactone) Synthesized by Janus Polymerization: A Novel Self-Healing Material. *Macromole. Chem. Phys.* 2017, 218(3)
56. Salmoria, G. V., Paggi, R. A. and Kanis, L. A. Manufacturing of PCL/SAg Tubes By Melt-Extrusion For Nerve Regeneration: Structure and Mechanical Properties. *Polymer Testing,* 2016, 55,160.
57. Kim, B. K., Lee, S. Y. and Xu, M. Polyurethanes Having Shape Memory Effects. *Polymer,* 1996,37(26), 5781.
58. Nicharat, A.; Shirole, A.; Foster, E. J.; Weder, C. Thermally Activated Shape Memory
Behavior of Melt-Mixed Polyurethane/Cellulose Nanocrystal Composites. *J. Appl. Polym. Sci.* 2017, 134.
59. Christenson, E. M.; Anderson, J. M.; Hiltner, A.; Baer, E. Relationship between Nanoscale Deformation Processes and Elastic Behavior of Polyurethane Elastomers. *Polymer* 2005, 46, 11744.
60. Xie, T. Recent Advances in Polymer Shape Memory. *Polymer* 2011, 52, 4985.

The invention claimed is:

1. A thermoplastic shape memory composition, comprising: a thermoplastic shape memory polymer and a modifier polymer wherein the thermoplastic shape memory polymer comprises poly(1,4-butylene adipate);
wherein the thermoplastic shape memory composition is capable of fixing a temporary shape by a melting and crystallization of a crystallizable portion of the thermoplastic shape memory composition;
wherein the temporary shape is capable of being released by a further melting of the crystallized portion of the thermoplastic shape memory composition;
and wherein a crystallization temperature of said crystallizable portion of said thermoplastic shape memory composition is at least 1° C. higher than that of a crystallizable portion of the thermoplastic shape memory polymer without the modifier polymer.

2. The thermoplastic shape memory composition according to claim 1, wherein the crystallization temperature of said crystallizable portion of said thermoplastic shape memory composition is higher by at least 5° C. than that of the crystallizable portion of the thermoplastic shape memory polymer without the modifier polymer.

3. The thermoplastic shape memory composition according to claim 1, wherein the crystallization temperature and a melting temperature of said crystallizable portion of said thermoplastic shape memory composition differ by at least 10° C.

4. The thermoplastic shape memory composition according to claim 3, wherein the crystallization temperature of the crystallizable portion of said thermoplastic shape memory composition is above about 10° C.;
wherein the crystallization temperature of the crystallizable portion of said thermoplastic shape memory composition is below 37° ;
wherein said melting temperature of the crystallizable portion of said thermoplastic shape memory composition is above 42° C. or more;
wherein the melting temperature of the crystallizable portion of said thermoplastic shape memory composition is less than 100° C.

5. The thermoplastic shape memory composition according to claim 1, wherein the amount of modifier polymer is at least 5% by weight, at least 10% based on 100 weight percent of the thermoplastic shape memory polymer and the modifier polymer.

6. The thermoplastic shape memory composition according to claim 1, wherein said modifier polymer is poly(1,4-butylene adipate) of a weight-average molecular weight of at least 6000 g·mol$^{-1}$ or poly(caprolactone) of a weight-average molecular weight of at least 10000 g·mol$^{-1}$.

7. The thermoplastic shape memory composition according to claim 1, wherein said thermoplastic shape memory polymer comprises the reaction product of at least (A) the poly (1,4-butylene adipate), (B) a low-molecular weight chain extender, and a (C) a diisocyanate.

8. The thermoplastic shape memory composition according to claim 7, wherein (B) is a diol or diamine, and said diisocyanate (C) is toluene diisocyanate or methylene diphenyl diisocyanate or hexamethylene diisocyanate, or hydrogenated methylene diphenyl diisocyanate, or isophorone diisocyanate, or a combination thereof.

9. The thermoplastic shape memory composition according to claim 1, wherein said thermoplastic shape memory polymer and said modifier polymer have at least partially reacted with each other.

10. The thermoplastic shape memory composition according to claim 1, wherein said thermoplastic shape memory polymer and said modifier polymer have essentially not reacted with each other.

11. A thermoplastic shape memory composition, comprising: a thermoplastic shape memory polymer and a modifier polymer, wherein the thermoplastic shape memory polymer comprises poly (1,4-butylene adipate);
wherein the thermoplastic shape memory composition is capable of fixing a temporary shape by a melting and crystallization of a crystallizable portion of the thermoplastic shape memory composition;
wherein the temporary shape is capable of being released by a further melting of the crystallized portion of the thermoplastic shape memory composition;
and wherein the crystallization temperature of said crystallizable portion of said thermoplastic shape memory composition is above about 10° C.;
wherein the crystallization temperature of said crystallizable portion of said thermoplastic shape memory composition is below 37° C.;
wherein the melting temperature of said crystallizable portion of said thermoplastic shape memory composition is about 42° C. or more;
wherein the melting temperature of said crystalline portion of said thermoplastic shape memory composition is less than 100° C.

12. A method for producing the thermoplastic shape memory composition of claim 1, comprising the steps of:
combining at least the thermoplastic shape memory polymer and the modifier polymer and forming a product therefrom.

13. A shape memory object comprising the thermoplastic shape memory composition according to claim 1.

14. The shape memory object according to claim 13, wherein the object returns largely to an original shape when heated above a switching temperature, and wherein a shape fixing and releasing cycle can be repeated multiple times.

15. The shape memory object according to claim 13, wherein said shape memory object is selected from the group consisting of: hearing aids, hearables, earbuds, ear-level devices for health monitoring applications, in-ear implants, earpieces of hearing aids, telephones, stethoscopes, earphones, in-ear headphones, earplugs, catheter retainers, mouth guards, orthodontic devices, frame templates, surgical staples, objects for surgery and surgical reconstruction, pressure garments, toys, automotive parts, ocular prosthesis, shape-memory fibers, shape memory textiles and clothing, gloves, shoe soles and insoles, shape memory foams, adapting grips, sportswear, helmets, and shin guards, or portions or components thereof.

16. A component of a hearing aid device for coupling to an ear of a hearing device user, comprising the thermoplastic shape memory composition according to claim 1.

17. A method to program the temporary shape of the thermoplastic shape memory composition according to claim 1, comprising the steps of:
- heating the thermoplastic shape memory composition above a melting temperature of the crystallizable portion of the thermoplastic shape memory composition;
- conforming the thermoplastic shape memory composition to the temporary shape;
- and cooling the thermoplastic shape memory composition below the crystallization temperature of the crystallizable portion of the thermoplastic shape memory composition while conforming the thermoplastic shape memory composition to the temporary shape.

* * * * *

UNITED STATES PATENT AND TRADEMARK OFFICE
CERTIFICATE OF CORRECTION

PATENT NO. : 11,643,550 B2
APPLICATION NO. : 16/978035
DATED : May 9, 2023
INVENTOR(S) : Christoph Weder et al.

It is certified that error appears in the above-identified patent and that said Letters Patent is hereby corrected as shown below:

In the Claims

Column 28, Line 1 In Claim 5, delete "at least 10%".

Column 28, Line 59 In Claim 14, delete "largely".

Signed and Sealed this
Twenty-ninth Day of August, 2023

Katherine Kelly Vidal
*Director of the United States Patent and Trademark Office*